United States Patent [19]

Kimura

[11] Patent Number: 5,267,323
[45] Date of Patent: Nov. 30, 1993

[54] VOICE-OPERATED REMOTE CONTROL SYSTEM

[75] Inventor: Toshiyuki Kimura, Kawagoe, Japan

[73] Assignee: Pioneer Electronic Corporation, Tokyo, Japan

[21] Appl. No.: 579,113

[22] Filed: Sep. 7, 1990

[30] Foreign Application Priority Data

Dec. 29, 1989 [JP] Japan .................................. 1-341624
Dec. 29, 1989 [JP] Japan .................................. 1-341625
Dec. 29, 1989 [JP] Japan .................................. 1-341626
Dec. 29, 1989 [JP] Japan .................................. 1-341627

[51] Int. Cl.$^5$ .................................. H03G 3/20
[52] U.S. Cl. .................................. 381/110; 381/42; 381/36
[58] Field of Search .................................. 381/110, 94, 36, 42, 381/56

[56] References Cited

U.S. PATENT DOCUMENTS

| | | | |
|---|---|---|---|
| 4,593,403 | 6/1986 | Kishi et al. | 381/110 |
| 4,725,956 | 2/1988 | Jenkins | 381/110 |
| 4,769,847 | 9/1988 | Taguchi | 381/94 |
| 4,815,134 | 3/1989 | Picone et al. | 381/36 |
| 4,827,520 | 5/1989 | Zeinstra | 381/42 |
| 4,926,484 | 5/1990 | Nakano | 381/56 |
| 4,947,436 | 8/1990 | Greaves et al. | 381/42 |

FOREIGN PATENT DOCUMENTS

| | | | |
|---|---|---|---|
| 2640324 | 3/1978 | Fed. Rep. of Germany | 381/95 |
| 0064994 | 4/1984 | Japan | 387/92 |
| 1604167 | 12/1981 | United Kingdom | 381/92 |

OTHER PUBLICATIONS

Anzo-3, National Semicondcutor, Feb. 1969.

*Primary Examiner*—Forester W. Isen
*Attorney, Agent, or Firm*—Sughrue, Mion, Zinn Macpeak & Seas

[57] ABSTRACT

A voice-operated remote control system has two microphone and an ambient noise remover in a transmitter. One of the microphones picks up a voice command, and the other picks up ambient noise. When the voice command is picked up by one microphone, the ambient noise is also picked up thereby. The ambient noise remover cancels an ambient noise component with an electric signal of the ambient noise picked up by the other microphone, and outputs only a voice command component. The remote control system may have a voice command detector and a mute control circuit. If the preparation of entry of a voice command is detected by the voice command detector, the mute control circuit lowers the sound pressure level of sound reproduced by an information reproducing device before the voice command starts being inputted. The remote control system may also have a recognition condition setting unit for automatically modifying speech recognition conditions if a voice command is rejected to be recognized. The remote control system may further include a speech storage unit for storing input voice commands and a speech reproduction unit for reproducing the stored voice commands as required.

9 Claims, 18 Drawing Sheets

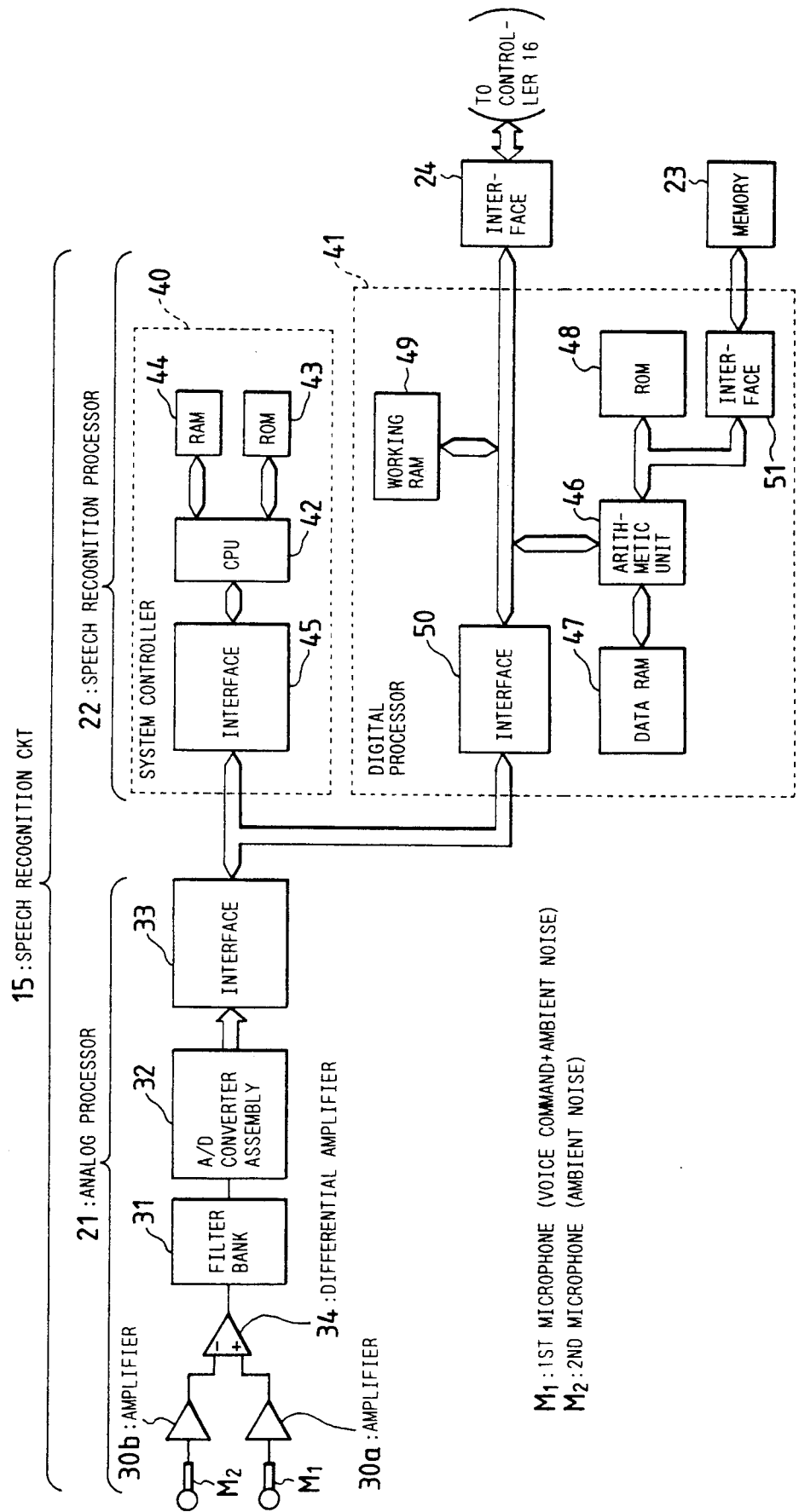

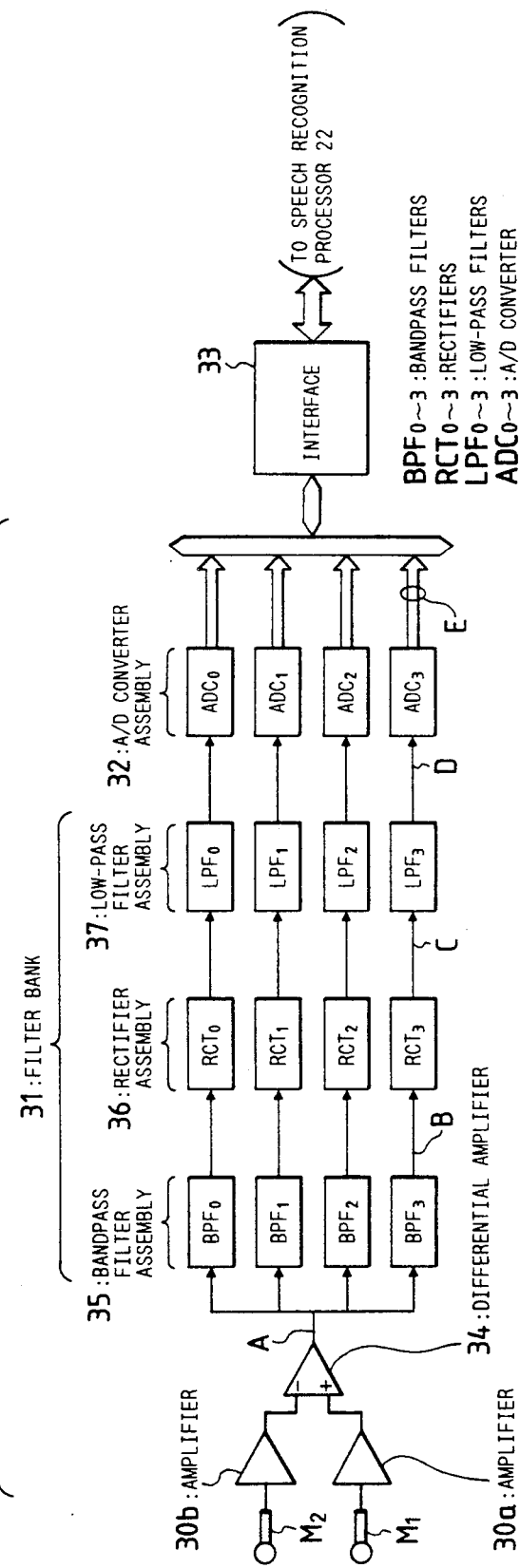

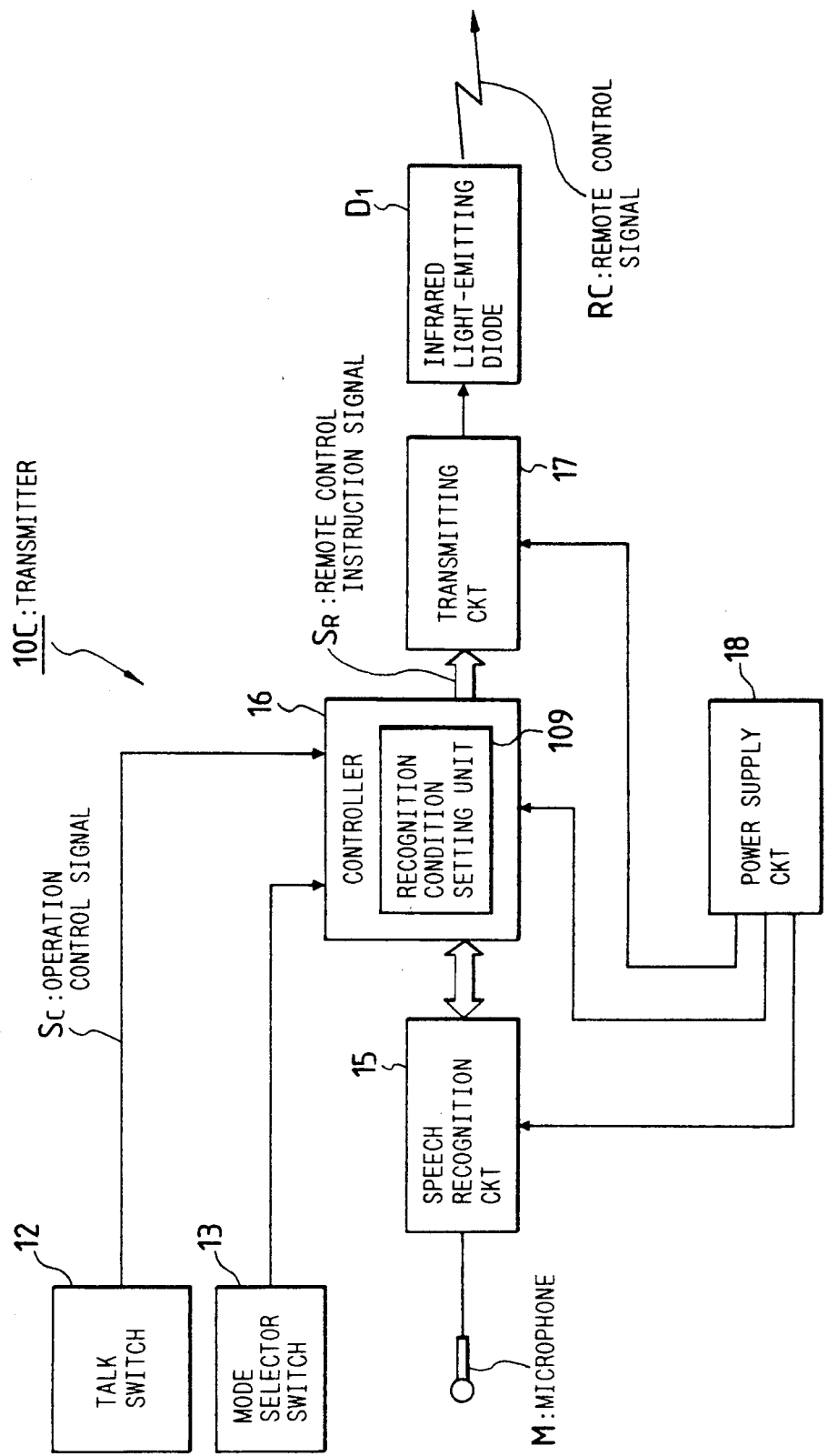

VOICE-OPERATED REMOTE CONTROL SYSTEM

BACKGROUND OF THE INVENTION

The present invention relates to a remote control system for remotely controlling various electronic devices, and more particularly to a remote control system for remotely controlling devices such as AV (audio visual) devices by way of voice commands.

In recent years, various AV devices such as stereo sets, television receivers, cassette tape decks, video tape decks, compact disc players, laser vision disc players, or the like are equipped with remote control systems.

A remote control system has a transmitter which is usually positioned remotely from a controlled AV device. The transmitter, when operated, transmits a remote control signal, such as an infrared remote control signal, which is received by a receiver in the controlled AV device. The received remote control signal is decoded to control the AV device as intended by the remote control signal.

There has recently been developed a voice-operated remote control system which employs voice control commands instead of control commands entered through keys. The voice-operated remote control system has a microphone mounted on a transmitter for converting a voice command into an electric voice signal, and a speech recognition LSI (Large Scale Integration) circuit for generating a remote control signal which corresponds to a voice pattern represented by the voice signal. The remote control signal thus generated is transmitted to a receiver in a controlled AV device.

The first problem with the voice-operated remote control system is that the microphone for receiving voice commands tend to pick up noise other than the voice commands, and the accuracy of speech recognition (speech recognition rate) is lowered by such noise.

According to one process of speech recognition, voice patterns of voice commands of the operator are registered as standard patterns, and a voice command which is entered by the operator during normal use is compared with the standard patterns to determine similarity therebetween. The standard pattern which has high similarity is then regarded as the input voice command. One drawback of such a speech recognition process is that if there is ambient noise near the microphone of the remote control system at the time of registering voice commands of the operator, then standard patterns are registered as combinations of the voice commands and the ambient noise, and a voice command which is actually entered may be recognized in error if there is no ambient noise. Another drawback is that even if the operator's voice commands are registered correctly, an actual voice command may not coincide with the registered standard pattern if there is ambient noise during use, and the voice command may be recognized in error.

The second problem with the voice-operated remote control system is that sounds reproduced by the speakers of a stereo set, for example, may act as ambient noise.

More specifically, the transmitter of a conventional voice-operated remote control system transmits remote control signals regardless of how an information reproducing device, which is remotely controlled by the remote control system, operates. As a result, if the information reproducing device is a device which acoustically reproduces recorded signals through speakers, e.g., a stereo set, then reproduced sounds other than voice commands exist around the microphone of the transmitter.

If the intensity of reproduced sounds from the information reproducing device is relatively high, such reproduced sounds as well as voice commands are picked up by the microphone. This results in a reduction in the speech recognition rate of the speech recognition unit in the voice-operated remote control system.

The third problem of the voice-operated remote control system is connected with adjustment of the speech recognition rate. According to one speech recognition process in the conventional voice-operated remote control system, a voice command which is entered through the microphone is converted into pattern data, which are then compared with a plurality of standard pattern data that have already been stored, so that the distance between the voice command pattern data and the standard pattern data is determined. If one of the standard pattern data has the smaller distance to the voice command pattern data and satisfies predetermined recognition conditions (e.g., the distance is smaller than a given distance), then command data which correspond to the standard pattern data are outputted. If all the standard pattern data fail to satisfy the predetermined recognition conditions, then a rejection signal representative of a recognition failure is outputted.

In cases where no proper speech recognition is achieved and rejection signals are produced frequently, then the operator may manually modify the predetermined recognition conditions or register standard pattern data again for thereby increasing the speech recognition rate. However, the manual modification of the recognition conditions is inconvenient and tedious for the operator.

The fourth problem of the voice-operated remote control system is addressed to disagreement between voice command words and registered standard patterns. Standard patterns which are necessary for speech recognition are produced by registering operator's voice commands as pattern data in advance. When the voice commands are to be registered, it is customary to simplify the voice commands or use key words for the voice commands. For example, a control command indicating that the playback process of a CD player should be started is converted into a voice command uttering "PLAY". Since such standard pattern data are registered extracting only features of voice commands, it is not possible to reconstruct original voice commands from the standard pattern data. Therefore, if the operator happens to forget a voice command registered as standard pattern data, then the operator is unable to control the controlled device using voice commands. When this happens, the operator has to register voice commands again, but such a process is tedious and time-consuming.

SUMMARY OF THE INVENTION

It is a first object of the present invention to provide a voice-operated remote control system which is less susceptible to ambient noise, has an increased speech recognition rate, and is prevented from being triggered into erroneous operation.

A second object of the present invention is to provide a voice-operated remote control system which is less susceptible to a relatively high intensity of sounds reproduced by an information reproducing device, for thereby increasing the speech recognition rate.

A third object of the present invention is to provide a voice-operated remote control system which, when a rejection signal is produced in response to the entry of a voice command, automatically modifies speech recognition conditions for an increased speech recognition rate.

A fourth object of the present invention is to provide a voice-operated remote control system which can reproduce a voice command corresponding to registered standard pattern data in case the operator forgets the registered voice command.

According to a first aspect of the present invention, there is provided a voice-operated remote control system comprising a transmitter for converting a voice command into a remote control signal and transmitting the remote control signal, and a receiver for receiving the remote control signal, decoding the remote control signal into a control command, and supplying the control command to a controlled device, the transmitter having a first microphone for picking up the voice command and ambient noise and converting the voice command and the ambient noise into a first electric signal, a second microphone for picking up the ambient noise and converting the ambient noise into a second electric signal, and ambient noise removing means for removing a signal component corresponding to the ambient noise from the first electric signal based on the first and second electric signals.

The first microphone converts ambient noise and a voice command into a first electric signal, and the second microphone converts the ambient noise into a second electric signal. The ambient noise removing means removes an ambient noise component from the first electric signal based on the first and second electric signals, and produces a voice command signal. Only the voice command signal is therefore applied to a speech recognition unit, so that the voice command signal is not adversely affected by the ambient noise. Consequently, the speech recognition rate is increased, and the transmitter is prevented from being triggered into an erroneous operation.

According to a second aspect of the present invention, there is provided a voice-operated remote control system for use with an information reproducing device which reproduces sound through acoustic radiating means at an adjustable sound pressure level, the voice-operated remote control system comprising a transmitter for converting a voice command into a remote control signal and transmitting the remote control signal, and a receiver, adapted to be associated with the information reproducing device, for receiving the remote control signal, decoding the remote control signal into a control command, and supplying the control command to the information reproducing device, the transmitter having detecting means for detecting whether a voice command is to be applied thereto and producing a detected signal, and mute control means for lowering the sound pressure level of the sound reproduced by the information reproducing device depending on the detected signal from the detecting means, before the voice command starts being applied.

The detecting means produces a detected signal which indicates when a voice command is to be applied. The mute control means is responsive to the detected signal from the detecting means for adding a mute command signal to a remote control signal, which is received by the transmitter. The transmitter decodes the received remote control signal and applies a decoded control signal to the information reproducing device. In response to the decoded signal, the information reproducing device lowers the level of a reproduced acoustic signal. Since the information reproducing device effects a mute operation before the voice command is actually applied, only the voice command is subsequently picked up by the microphone of the transmitter.

According to a third aspect of the present invention, there is provided a voice-operated remote control system comprising a transmitter having a microphone for converting a voice command into an electric signal and speech recognition means for converting the voice command into pattern data based on the electric signal from the microphone, comparing the pattern data of the voice command with predetermined standard pattern data, and determining an output signal representative of the result of comparison based on a speech recognition condition, thereby to transmit a remote control signal corresponding to the voice command, and a receiver for receiving the remote control signal, decoding the remote control signal into a control command, and supplying the control command to a controlled device, the transmitter having recognition condition setting means for applying a command to automatically modify the speech recognition condition to the speech recognition means when the voice command is rejected to be recognized by the speech recognition means.

If a voice command is rejected by the speech recognition means, then the recognition condition setting means delivers a command for automatically modifying the recognition condition to the speech recognition means. Therefore, the speech recognition rate can be increased without the operator having to adjust the recognition condition.

According to a fourth aspect of the present invention, there is provided a voice-operated remote control system for transmitting a remote control signal corresponding to a voice command, comprising a speech storage unit for storing data of the voice command, and a speech reproduction unit for reading the data of the voice command from the speech storage unit in response to an external reproduction command signal and for converting the voice command data into a voice output.

The speech storage unit stores data of a voice command. In response to an external reproduction command signal, the speech reproduction unit reads the stored voice command data from the speech storage unit, and converts the voice command data into a voice output. Therefore, the word corresponding to the voice command can be reproduced as the voice output when necessary.

According to a fifth aspect of the present invention, a voice-operated remote control system for transmitting a remote control signal corresponding to a voice command, comprising a speech reproduction unit for reading the data of the voice command from the speech storage unit in response to an external reproduction command signal and for converting the voice command data into a voice output, and a register unit for generating and registering comparative standard pattern data based on the voice command data, the speech storage unit having means, operable with the register unit, for storing the voice command data when the standard pattern data are generated by the register unit.

The speech storage unit operates with the register unit to store voice command data when standard pattern data are generated by the register unit. Therefore, the voice command data are stored at the same time when the standard pattern data is registered. It is not necessary to individually store voice command data for the reproduction of voice command words. Since the voice commands as registered can completely be reproduced, the remote control system can control the controlled device correctly with the voice commands.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8 is a detailed block diagram of the speech recognition circuit according to the first embodiment;

FIG. 9(a) is a diagram showing an analog processor;

FIGS. 9(b) through 9(h) are diagrams showing the waveforms of signals in the analog processor shown in FIG. 9(a);

FIG. 17 is a detailed block diagram of the transmitter shown in FIG. 16;

DETAILED DESCRIPTION OF THE INVENTION

General Remote Control System

For a better understanding of the present invention, a general remote control system and a voice remote control signal will first be described below.

Figure 1:
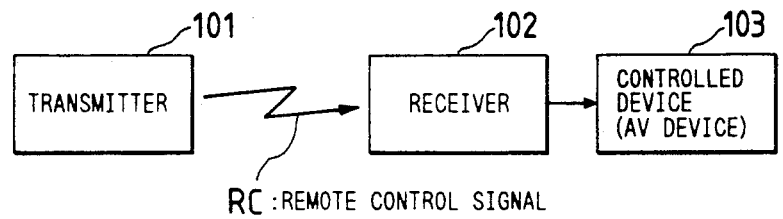
FIG. 1 is a block diagram of a general remote control system.

As shown in FIG. 1, a remote control system 100 comprises a transmitter 101 for transmitting a remote control signal from a position remote from a controlled device 103 such as an AV device, and a receiver 102 for receiving the transmitted remote control signal, decoding z the remote control signal, and sending the decoded information to the controlled device 103.

Figure 2:
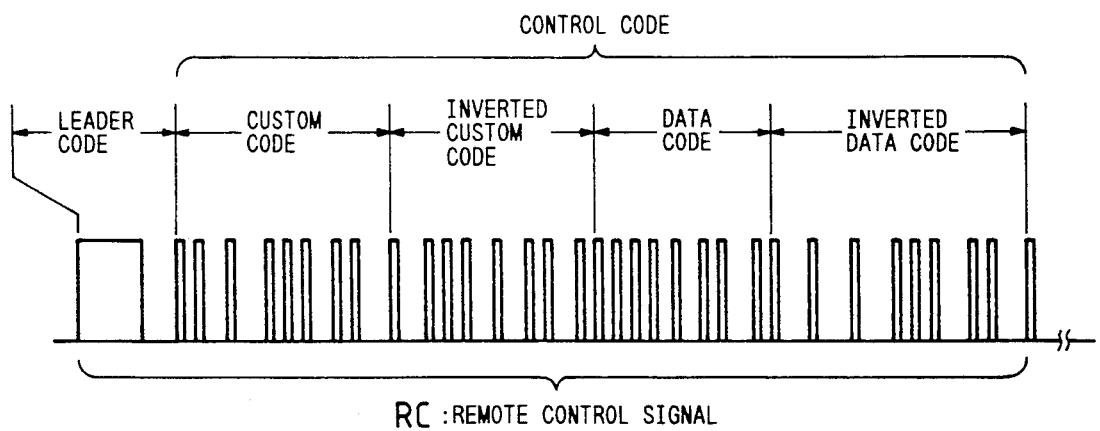
FIG. 2 is a diagram showing a remote control signal by way of example.

FIG. 2 shows a general remote control signal. The remote control signal is composed of a leader code which indicates the transmission of data to a receiver, a custom code and an inverted custom code which indicate a controlled device, a data code and an inverted data code which indicate a control command for the controlled device. The inverted custom code and the inverted data code are used to detect any error in the custom code and the data code, respectively.

Figure 3:
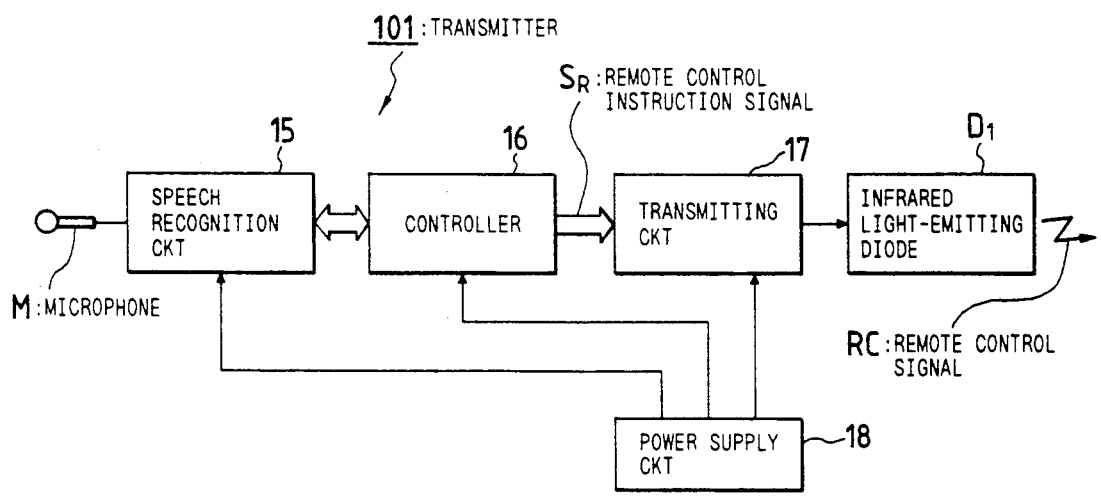
FIG. 3 is a block diagram of the transmitter of a general voice-operated remote control system.

FIG. 3 schematically shows the transmitter 101 of the voice-operated remote control system 100. The transmitter 101 has a microphone M for converting a voice command into an electric signal. The converted electric signal is applied to a speech recognition circuit 15 in the form of a speech recognition LSI circuit or the like which includes a microprocessor. The speech recognition circuit 15 recognizes the contents of the applied electric signal, and produces command data corresponding to the recognized contents. The transmitter 101 also has a controller 16 comprising a microprocessor. Based on the command data from the speech recognition circuit 15, the controller 16 produces and applies a remote control instruction signal SR to a transmitting circuit 17, which then energizes an infrared light-emitting diode D1 to transmit a remote control signal RC. The above components of the transmitter 101 are supplied with electric energy from a power supply circuit 18.

When a voice command is received through the microphone M, the speech recognition circuit 15 converts the voice command into pattern data. The speech recognition circuit 15 compares the voice command pattern data with a plurality of standard pattern data which are stored therein, and determines the distance between the voice command data and the standard pattern data, and outputs command data corresponding to the standard pattern data, the distance of which from the voice command pattern data is smallest. There may also be employed another speech recognition process in which the similarity of the compared pattern data is determined according to a simple similarity method and command data corresponding to the standard pattern data which has the highest similarity are outputted. The command data thus produced are applied to the controller 16.

The controller 16 sends a remote control signal SR corresponding to the applied command data to the transmitting circuit 17. In response to the supplied remote control instruction signal SR, the transmitting circuit 17 drives the infrared light-emitting diode D1 to transmit a remote control signal RC. The controlled device 103 is therefore remotely controlled by the remote control signal RC.

First Embodiment

A voice-operated remote control system according to a first embodiment of the present invention will now be described below with reference to FIGS. 4 through 10.

External Structure

Figure 4:
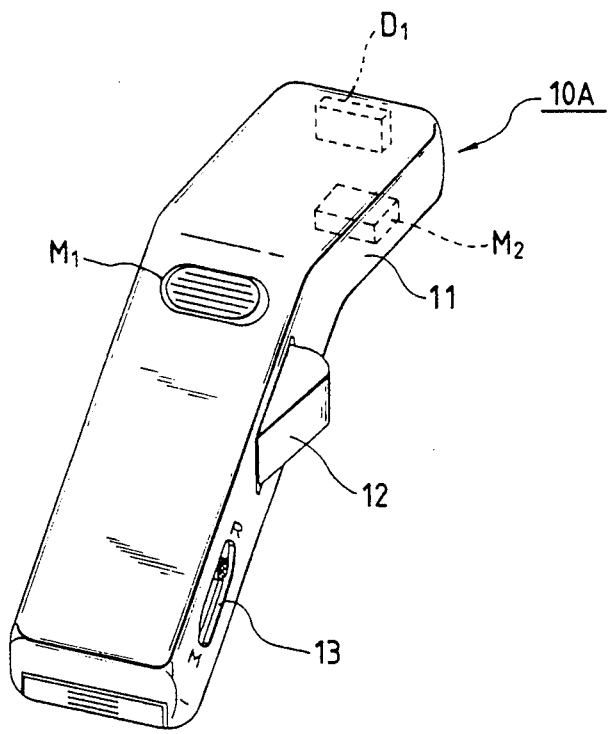
FIG. 4 is a perspective view of the transmitter of a voice-operated remote control system according to a first embodiment of the present invention.

As shown in FIG. 4, a transmitter 10A of the voice-operated remote control system has a unitary casing 11 which allows the operator to carry the transmitter freely around. The casing 11 supports a microphone M1 on an upper panel (face panel) thereof, and another microphone M2 on a lower panel (back panel) thereof. The microphone M1 converts a voice command given by the operator and ambient noise into an electric signal. The microphone M2 serves to collect ambient noise around the transmitter 1. An infrared light-emitting diode D1, for example, is mounted in one end of the casing 11. The infrared light-emitting diode D1 is used to transmit a remote control signal to the receiver of a remotely controlled device (not shown). On one side of the casing 11, there is disposed a voice input switch (hereinafter referred to as a "talk switch") 12 which is closed when pressed and can automatically be released or opened when released. The talk switch 12 may be an automatic-return pushbutton switch or a slide-type switch. When a voice command is to be entered, the talk switch 12 is closed to operate the transmitter 10A. Otherwise, the talk switch 12 is open keeping the transmitter 10A out of operation. The casing 11 also supports on its side a mode selector switch 13 in the form of a slide-type switch, for example. The mode selector switch 13 serves to select one of modes at a time. The modes include a speech registration mode in which a voice command is registered in the transmitter 10A and a speech recognition mode in which a voice command is recognized, as described later on. The casing 11 accommodates therein an electronic circuit of the voice-operated remote control system according to the present invention.

Electronic Circuit Structure

Figure 5:
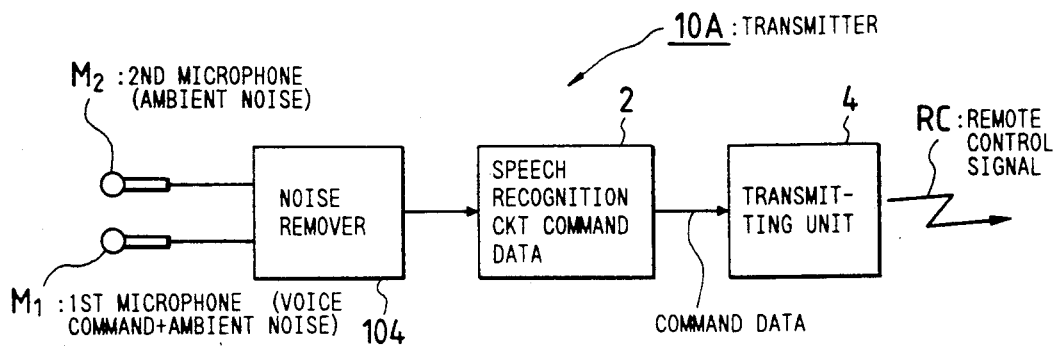
FIG. 5 is a block diagram of the transmitter of the voice-operated remote control system according to the first embodiment.

FIG. 5 shows in block form the electronic circuit of the transmitter 10A of the voice-operated remote control system according to the present invention. The transmitter 10A has two microphones M1, M2, as described above. The first microphone M1 serves to input a voice command, and the second microphone M2 serves to pick up ambient sound or noise other than voice commands, around the transmitter 10A. Each of the microphones M1, M2 converts an applied acoustic signal into an electric signal, which is sent to a noise remover 104. The noise remover 104 removes the ambient noise component based on the electric signals transmitted from the microphones M1, M2, and applies only an electric signal corresponding to the applied voice command to a speech recognition unit 2. The speech recognition unit 2 recognizes the voice command based on the electric signal from the noise remover 104, produces command data corresponding to the voice command based on the result of recognition, and sends the command data to a transmitting unit 3. The transmitting unit 3 generates a remote control signal RC which represents the command data from the speech recognition unit 2 and transmits the remote control signal RC to the receiver of a remotely controlled device.

Figure 6:
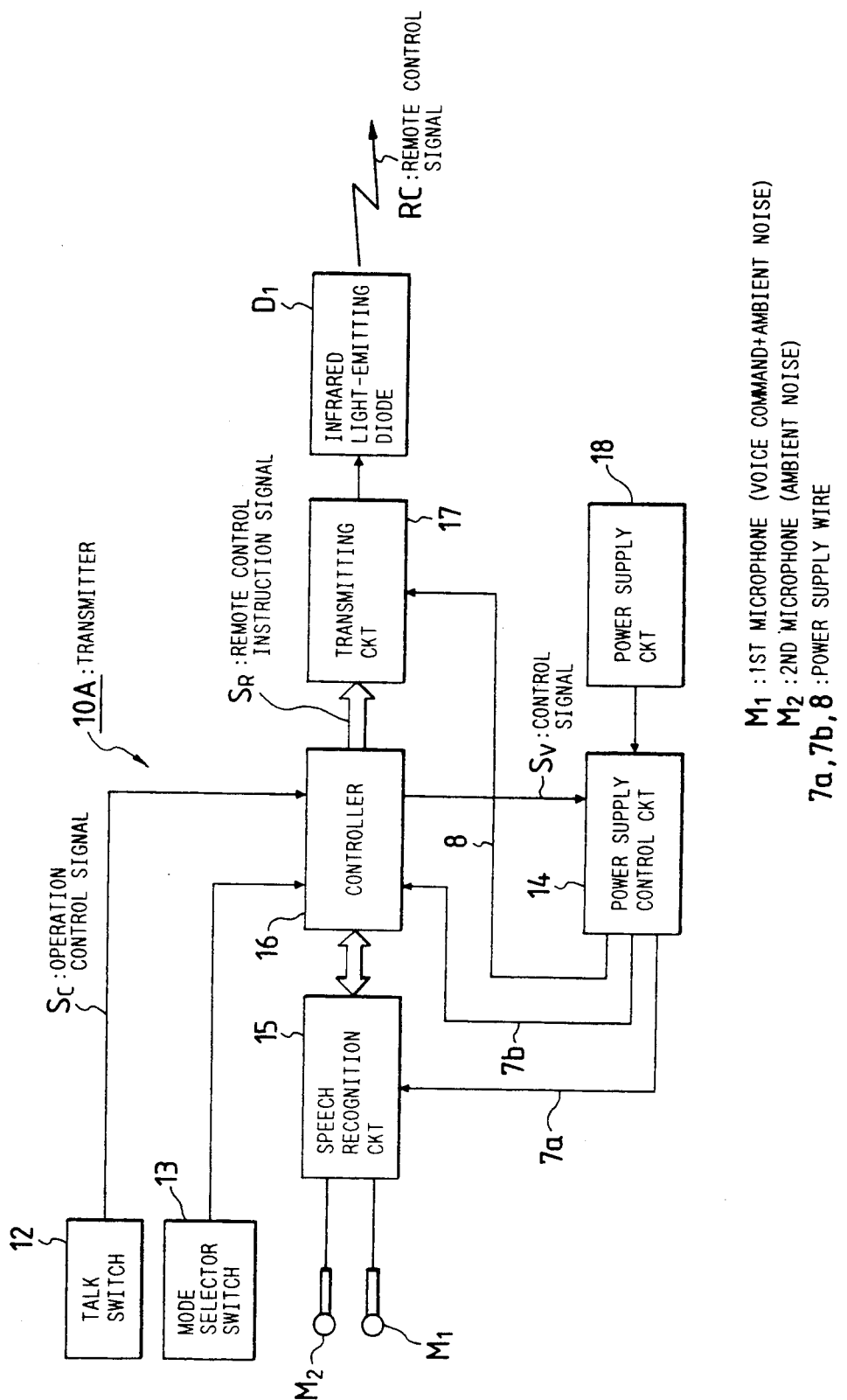
FIG. 6 is a detailed block diagram of the transmitter shown in FIG. 4.

FIG. 6 shows the electronic circuit of the transmitter 1 in greater detail. The speech recognition unit 2 (FIG. 5) comprises a speech recognition circuit 15 and a controller 16. The transmitting unit (FIG. 5) comprises a transmitting circuit 17 and an infrared light-emitting diode D1 connected thereto. The controller 16 is connected between the speech recognition circuit 15 and the transmitting circuit 17. The talk switch 12, which is connected to the controller 16, supplies the controller 16 with an operation control signal Sc which enables the transmitter 1 to operate only when a voice command is applied. The talk switch 12 may comprise an automatic-return switch having a pushbutton, a slide switch, or the like. A power supply circuit 18 supplies electric energy through a power supply control circuit 14 over power supply wires 7a, 7b, 8 to the speech recognition circuit 15, the controller 16, and the transmitting circuit 17.

Figure 7:
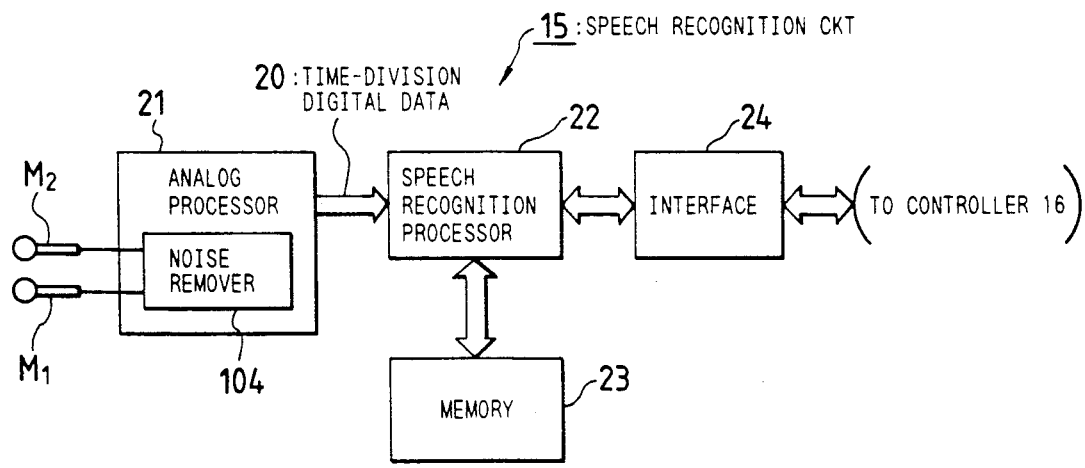
FIG. 7 is a block diagram of a speech recognition circuit according to the first embodiment.

As shown in FIG. 7, the speech recognition circuit 15 comprises an analog processor 21 for processing an analog voice command signal which is received through the microphones M1, M2 and outputting the processed analog voice command signal as a time-division digital data 20, a speech recognition processor 22 for recognizing the voice command based on the time-division digital data 20 from the analog processor 21, a memory 23 for storing standard pattern data for speech recognition, and an interface 24 for transmitting signals to and receiving signals from the controller 16.

As shown in FIG. 8, the analog processor 21 generally comprises an amplifier 30a for amplifying a voice command signal transmitted from the microphone M1 to a suitable level, an amplifier 30b for amplifying a voice command transmitted from the microphone M2 to a suitable level, a differential amplifier 34, serving as a noise removing circuit, for producing a differential signal indicative of the difference between output signals from the amplifiers 30a, 30b, a filter bank 31 for dividing an output signal from the differential amplifier 34 into signals in different frequency bands and rectifying and outputting the signals in these different frequency bands, an analog-to-digital converter assembly (hereinafter referred to as an "A/D converter assembly") 32 for converting the output signals in the different frequency bands from the filter bank 31 into digital signals, and an interface 33 for transmitting signals to and receiving signals from the speech recognition processor 22.

As shown in FIG. 9(a), the filter bank 31 comprises a bandpass filter assembly 35 for dividing the input voice signal into signals in a plurality of frequency bands (four frequency bands in FIG. 9(a)), a rectifier assembly 36 for rectifying output signals from the bandpass filter assembly 35, and a low-pass filter assembly 37 for removing ripples from output signals from the rectifier assembly 36.

The bandpass filter assembly 35 comprises a plurality of (four in FIG. 9(a)) bandpass filters BPF0 through BPF3 which have respective central frequencies f0, f1, f2, f3 (f0<f1<f2<f3) corresponding to the frequency bands.

The rectifier assembly 36 comprises four rectifiers RCT0 through RCT3 connected in series with the bandpass filters BPF0 through BPF3 of the bandpass filter assembly 35, respectively. The rectifiers RCT0 through RCT3 rectify the output signals from the bandpass filters BPF0 through BPF3 in the respective frequency bands.

The low-pass filter assembly comprises four low-pass filters LPF0 through LPF3 connected in series with the rectifiers RCT0 through RCT3 of the rectifier 36, respectively. The low-pass filters LPF0 through LPF3 remove ripples from the rectified signals in the respective frequency bands.

The A/D converter assembly 32 comprises four A/D converters ADC0 through ADC3 connected in series with the low-pass filters LPF0 through LPF3 of the low-pass filter z assembly 37, respectively. The A/D converters ADC0 through ADC3 convert the analog output signals from the low-pass filters LPF0 through LPF3 into digital signals.

Operation of the analog processor 21 will be described below. For the sake of brevity, only signal processing in one frequency band (e.g., through the bandpass filter BPF3) will be described. However, similar signal processing is carried out in the other frequency bands.

When ambient noise and a voice command are applied to the microphone M1, the output electric signal from the microphone M1 is amplified to a suitable signal level by the amplifier 30a, which outputs an amplified signal Z1 (see FIG. 9(c)). When ambient noise is applied to the microphone m2, the output electric signal from the microphone M2 is amplified to a suitable signal level by the amplifier 30b, which outputs an amplified signal Z2 (see FIG. 9(b)). The output signals from the amplifiers 30a, 30b are applied to the differential amplifier 34, which then applies a differential signal A to the bandpass filter BPF3 (see FIG. 9(d)), which then passes only a signal B in its passband. The signal B is then applied to the rectifier RCT3 (see FIG. 9(e)). The signal B is rectified by the rectifier RCT3, and a rectified output signal C (FIG. 9(f)) from the rectifier RCT3 is transmitted to the low-pass filter LPF3. The low-pass filter LPF3 removes ripples which may be contained in the signal C, and produces a ripple-free output signal D (see FIG. 9(g)) which is then inputted to the A/D converter ADC3. The A/D converter ADC3 then converts the supplied input signal D into a signal E composed of 4-bit time-division digital data (1010), (0111), (0101), (0111), (1101), ..., as shown in FIG. 9(h).

As illustrated in FIG. 8, the speech recognition processor 22 comprises a system controller 40 for analyzing and processing control commands from the controller 16 and also for controlling the entire operation of the speech recognition processor 22, and a digital processor 41 for effecting distance calculations and controlling the memory 23.

The system controller 40 comprises a CPU (Central Processing Unit) 42 for controlling the overall operation of the transmitter 10A, a ROM (Read-Only Memory) 43 for storing a control program to be executed by the CPU 42 for the overall operation of the transmitter 10A, a RAM (Random Access Memory) 44 for temporarily storing data, and an interface 45 for transmitting data to and receiving data from the analog processor 21 and the digital processor 41.

The digital processor 41 comprises an arithmetic unit 46 for effecting distance calculations and identifying input voice commands based on the results of the distance calculations, a data RAM 47 for storing data necessary for distance calculations, a ROM 48 for storing a program for distance calculations, a working RAM 49 for temporarily storing processed data, an interface 50 for transmitting data to and receiving data from the analog processor 21 and the system controller 40, and an interface 51 for transmitting data to and receiving data from the memory 23.

The speech recognition processor 22 operates as follows: When a control command is applied from the controller 16 through the interface 24 to the speech recognition processor 22, the system controller 40 receives the control command through the interfaces 50, 45 and analyzes the received control command. If the result of analysis indicates a speech recognition process, the system controller 40 sends an instruction for speech recognition to the digital processor 41 through the interfaces 45, 50.

When instructed by the system controller 40, the digital processor 41 introduces time-division digital data (input voice command signal) 20 from the analog processor 21 through the interface 50 into the data RAM 47. The arithmetic unit 46 reads the first standard pattern data from the memory 23 which stores a plurality of standard pattern data, through the interface 51. Then, the arithmetic unit 46 determines the logarithm of the first time-division digital data of a plurality of time-division digital data which constitute the read standard pattern data and also the logarithm of the first time-division digital data of the input voice command signal, and then determines the differences between the logarithms. The arithmetic unit 46 further squares the differences, and adds the squares to determine a distance D. Therefore, the distance D is given by:

$$D = \sum_{t=0}^{x} (\log(f(t)) - \log(fs(t)))^2$$

where
- x: the number of time divisions;
- f(t): the input voice command data (time-division digital data); and
- fs(t): the standard pattern data (time-division digital data).

Likewise, the distances D are calculated in the same manner for all the standard pattern data. The smaller the calculated distances, the higher the probability that the standard pattern data are similar to the voice command. The recognition result thus obtained is then outputted as command data through the interface 24 to the controller 16.

Referring back to FIG. 6, the controller 16 is in the form of a microprocessor, for example. The microprocessor of the controller 16 comprises a CPU, a ROM, a RAM, and an interface. The CPU executes arithmetic operations while referring to data stored in the RAM, which serves as a working memory, according to the algorithm (see FIG. 10) of a control program stored in the ROM, for thereby effecting the overall operation of the transmitter 10A. The controller 16 also switch 13 as interrupt signals, and effects control functions according to commands indicated by these interrupt signals. Operation of the transmitter 10A under the control of the controller 16 will be described below.

Overall Operation

The transmitter 1 operates depending on whether the talk switch 12 is pressed or released (i.e., turned on or off). If the talk switch 12 is pressed, the transmitter 1 is capable of transmitting remote control signals, and if the talk switch 12 is released, the transmitter 1 is kept in the low power consumption mode, waiting for voice commands to be applied. There are two input modes for entering voice commands. In one input mode, voice commands of the operator are registered, and in the other input mode, voice commands of the operator are recognized. In the voice registration mode, a command word such as "reproduction" is recorded in the transmitter 1.

Figure 10:
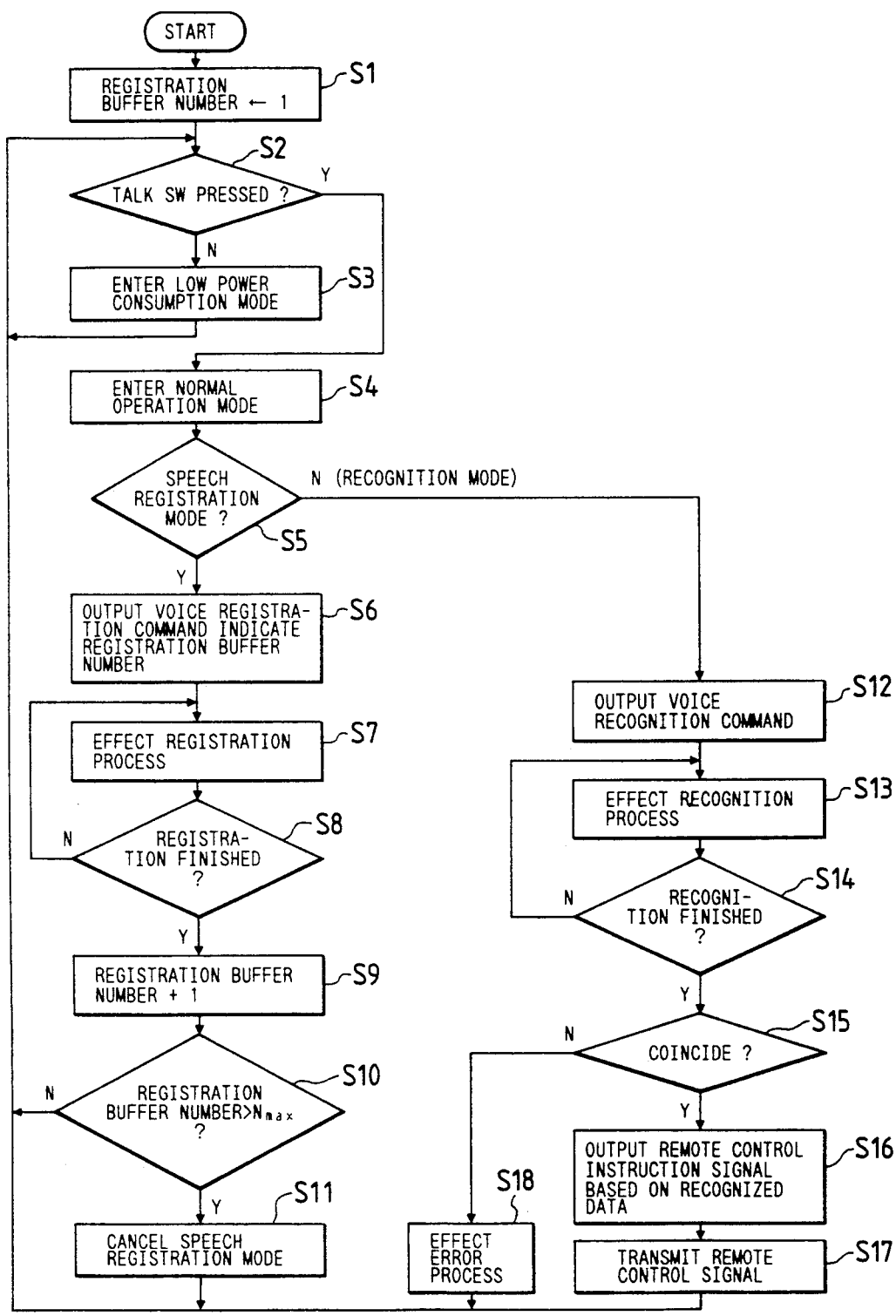
FIG. 10 is a flowchart of an operation sequence of the transmitter according to the first embodiment.

Now, operation of the transmitter 1 will be described below with reference to the flowchart of FIG. 10. It is assumed that the talk switch 12 is not pressed and the transmitter 1 is in a standby condition in the low power consumption mode.

First, the controller 16 initializes a registration buffer number to 1 in a step S1.

Then, the controller 16 detects whether the talk switch 12 is pressed or not in a step S2 by detecting whether there is produced an operation control signal Sc from the talk switch 12 or not. If an operation control switch Sc is produced at this time, then it means that the talk switch 12 is pressed, and the controller 16 sends a control signal Sv to the power supply control circuit 14. The power supply control circuit 14 supplies electric energy in a normal mode, enabling the transmitter 10A in a step S4.

If the talk switch 12 is not pressed, the transmitter 1 is left in the low power consumption mode, and the steps S2 and S3 are repeated, waiting for a voice command.

Thereafter, the controller 16 reads the condition of the mode selector switch 13 to determine whether it indicates the speech registration mode for voice commands or not in a step S5.

If the speech registration mode is indicated, control then goes to a step S6 in which the controller 16 outputs a command to instruct the speech recognition circuit 15 to carry out a speech registration process. At the same time, the controller 16 sends a registration buffer number to the speech recognition circuit 15 in the step S6.

The speech recognition circuit 15 then stores speech recognition standard pattern data in a corresponding registration buffer in the memory 23, i.e., a registration buffer having the registration buffer number=1, in a step S7.

The controller 16 reads a status register (not shown) in the speech recognition circuit 15 to determine whether the registration of a voice command is finished or not in a step S8. If the registration is not yet finished, then the steps S7 and S8 are repeated until the registration is finished. If the registration is finished, the registration buffer number is incremented by 1 in a step S9. The increment updates the registration buffer number, making the registration buffer ready for the storage of standard pattern data.

Then, the controller 16 determines whether the current registration buffer number has exceeded a maximum number Nmax that can be registered or not in a step S10. If not, then control returns to the step S2. If exceeded, the controller 16 sends a command to cancel the speech registration mode to the speech recognition circuit 15, thereby canceling the speech registration mode in a step S11. Then, control goes back to the step S2.

If the speech registration mode is not indicated by the mode selector switch 13 in the step S5, i.e., if the speech recognition mode is indicated by the mode selector switch 13 in the step S5, then the controller 16 outputs a speech recognition command to the speech recognition circuit 15 in a step S12. The speech recognition circuit 15 now effects, in a step S13, a speech recognition process as described above with reference to FIG. 8, i.e., by determining the distance D between the input voice command data and the standard pattern data to determine similarity therebetween.

The controller 16 reads a status register (not shown) in the speech recognition circuit 15 to determine whether the speech recognition of the input voice command is finished or not in a step S14. If the speech recognition is not yet finished, then the steps S13 and S14 are repeated until the registration is finished. If the speech recognition is finished, then the controller 16 determines whether the input voice command data and the standard pattern data coincide with each other, i.e., the distance D falls within a predetermined distance, or not in a step S15. If the input voice command data and the standard pattern data coincide with each other in the step S15, the controller 16 produces a remote control instruction signal SR based on the recognized voice command data and sends the remote control instruction signal SR to the transmitting circuit 17 in a step S16. In response to the remote control instruction signal SR, the transmitting circuit 17 transmits a corresponding remote control signal RC in a step S17. If the input voice command data and the standard pattern data do not coincide with each other in the step S15, then the controller 16 effects an error process such as the generation of a buzzer sound in a step S18, and control goes back to the step S2.

Since only the voice command is produced and transmitted by the noise remover 104 to the speech recognition unit 2 based on the output signals from the microphones M1, M2, the voice command which is received can be recognized correctly regardless of ambient noise which may exist around the transmitter 10A, and the transmitter 10A is prevented from being triggered into an erroneous operation.

Second Embodiment

A voice-operated remote control system according to a second embodiment of the present invention will be described below with reference to FIGS. 11 through 15.

The voice-operated remote control system according to the second embodiment is basically designed to increase the speech recognition rate when voice commands are entered through the microphone of the transmitter thereof while there is ambient noise present around the transmitter. If the remote control system is combined with a sound reproducing device such as a stereo set, a television set, or the like, the reproduced sound thereof acts as ambient noise from the standpoint of voice command recognition. According to the second embodiment, when a voice command is entered through the microphone, the intensity of the reproduced sound or the sound pressure level of the reproducing device is automatically lowered. Such a reduction in the intensity of the reproduced sound or the sound pressure level will hereinafter be referred to as a mute operation. While in the first embodiment ambient noise is picked up and used to cancel the ambient noise that is entered with a voice command, the intensity of reproduced sound acting as ambient noise is intentionally lowered to increase the speech recognition rate according to the second embodiment.

External Structure

Figure 11:
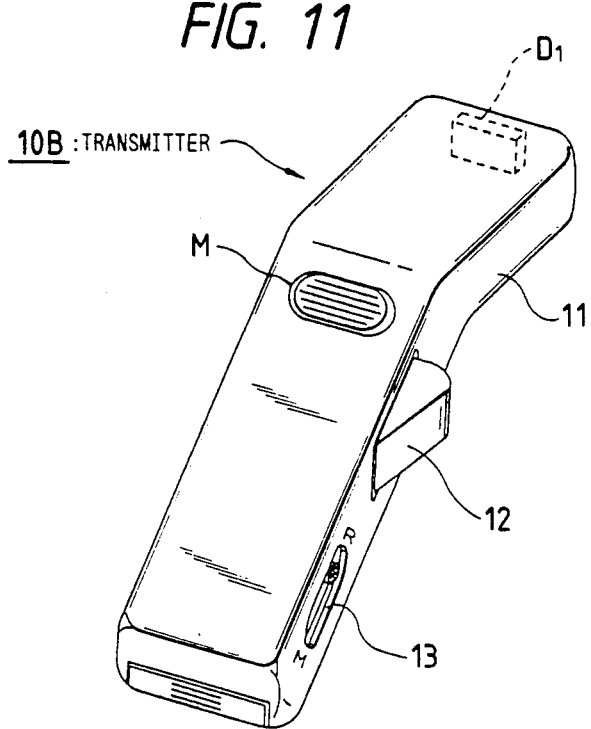
FIG. 11 is a perspective view of the transmitter of a voice-operated remote control system according to a second embodiment of the present invention.

As shown in FIG. 11, the external structure of the transmitter, generally indicated at 10B, of the voice-operated remote control system according to the second embodiment is basically the same as that of the transmitter 10A shown in FIG. 4, except that the transmitter 10B has a single microphone M on the upper panel of the casing. The other structural details, such as the shape of the casing 11, the type and location of the talk switch 12, the mode selector switch 13, and the infrared light-emitting diode D, are identical to those of the transmitter 10A shown in FIG. 4.

Electronic Circuit Structure

Figure 12:
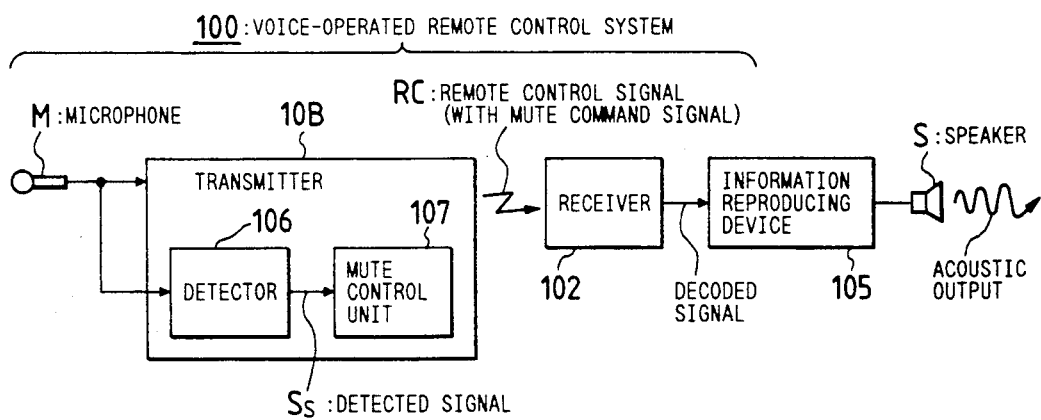
FIG. 12 is a block diagram of the transmitter of the voice-operated remote control system according to the second embodiment.

As shown in FIG. 12, the voice-operated remote control system, generally denoted at 100, includes the transmitter 10B which converts a voice command entered through a microphone M into a remote control signal RC and transmits the remote control signal RC. The transmitted remote control signal RC is received by a receiver 102 as a control signal for an information reproducing device 105.

The transmitter 10B has a detector 106 for determining whether there is entered a voice command or not, and a mute control unit 107 for either lowering, by a predetermined sound pressure level, the sound reproduced by the information reproducing device 105 or inhibiting the reproduced sound (i.e., reducing the reproduced sound level to 0), if a voice command is entered through the microphone M.

Figure 13:
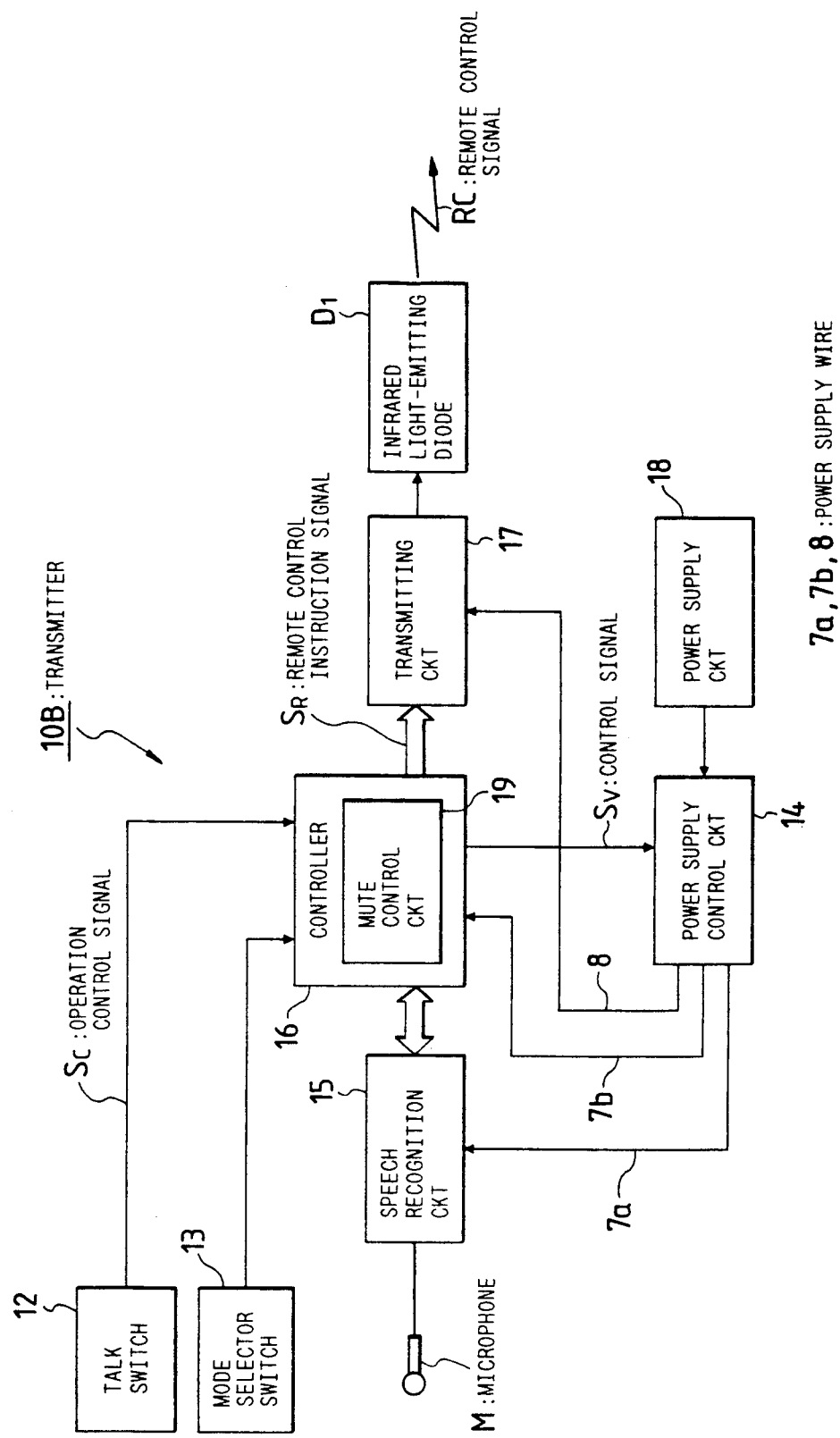
FIG. 13 is a detailed block diagram of the transmitter shown in FIG. 11.
Figure 14:
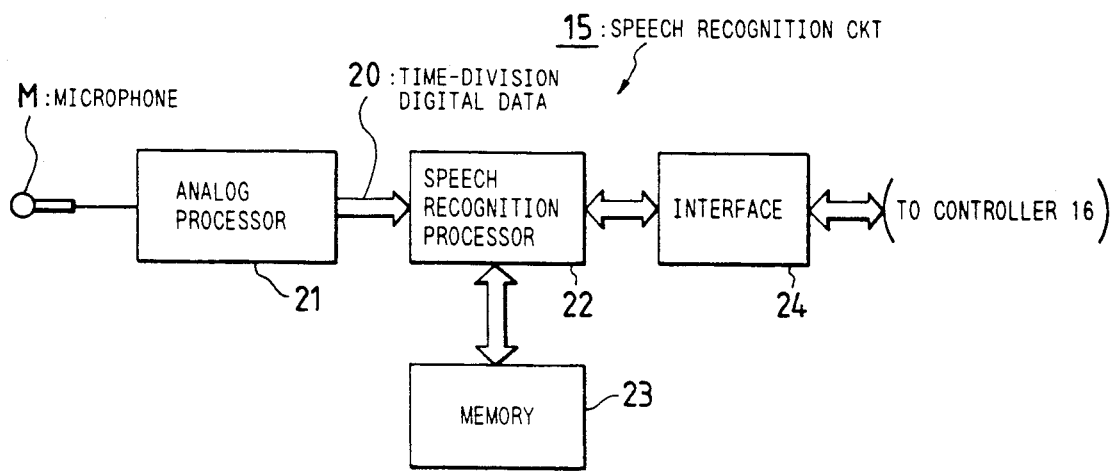
FIG. 14 is a block diagram of a speech recognition circuit according to the second embodiment.

More specifically, as illustrated in FIG. 13, the transmitter 10B has a controller 16 which includes a mute control circuit 19 that comprises the detector 106 and the mute control unit 107 (FIG. 12). The mute control circuit 19 may be hardware-implemented by an independent electric circuit. In the illustrated embodiment, however, the mute control circuit 19 is software-implemented according to a mute control program which is either stored in a memory that stores a control program for the controller 16 or included in the control program for the controller 16. Specifically, the mute control unit 107 is implemented by a step S16 in FIG. 15, and the detector 106 is implemented by a step S12 in FIG. 15.

The other structural details of the transmitter 10B are the same as those of the transmitter 10A shown in FIGS. 6 through 9.

Overall Operation

Operation of the voice-operated remote control system 100 will be operated below. In an initial condition, the talk switch is not pressed and the transmitter 10B is in a standby condition in the low power consumption mode.

First, the controller 16 initializes a registration buffer number to 1 in a step S21 (FIG. 11).

Then, the controller 16 detects whether the talk switch 12 is pressed or not in a step 22 by detecting whether there is produced an operation control signal Sc from the talk switch 12 or not. If an operation control switch Sc is produced at this time, then it means that the talk switch 12 is pressed, and the controller 16 sends a control signal Sv to the power supply control circuit 14. The power supply control circuit 14 supplies electric energy in a normal mode, enabling the transmitter 10B in a step S25, and then control goes to a step S26.

If the talk switch 12 is not pressed, the controller 16 keeps the transmitter 10B in the low power consumption mode, and the step 22 and a step S24 are repeated. Since the transmitter 10B is in the low power consumption mode at this time, a remote control signal RC for canceling the mute operation is not transmitted. With respect to a step 23, an explanation will be made hereinafter.

Prior to the entry of a voice command, the mute control circuit 19 of the controller 16 supplies the transmitting circuit 17 with a remote control instruction signal SR to add a signal for effecting a mute operation of the information reproducing device to a remote control signal RC in a step 15. In response to the remote control instruction signal SR, the transmitting circuit 17 energizes the infrared light-emitting diode D1 to transmit a remote control signal to cause the information reproducing device to effect a mute operation in a step S26. The information reproducing device now effects a mute operation, e.g., lower the reproduced sound level by 20 dB, thus reducing the intensity of reproduced sound radiated from the speakers of the information reproducing device. Thereafter, the controller 16 reads the condition of the mode selector switch 13 to determine whether it indicates the speech registration mode or not in a step S27.

If the speech registration mode is indicated, control then goes to a step S28 in which the controller 16 outputs a command to instruct the speech recognition circuit 15 to carry out a speech registration process. At the same time, the controller 16 sends a registration buffer number to the speech recognition circuit 15 in the step S28.

The speech recognition circuit 15 then stores speech recognition standard pattern data in a corresponding registration buffer in the memory 23, i.e., a registration buffer having the registration buffer number=1, in a step S29.

The controller 16 reads a status register (not shown) in the speech recognition circuit 15 to determine whether the registration of a voice command is finished or not in a step S30. If the registration is not yet finished, then the steps S29 and S30 are repeated until the registration is finished. If the registration is finished, the registration buffer number is incremented by 1 in a step S31. The increment updates the registration buffer number, making the registration buffer ready for the storage of standard pattern data.

Then, the controller 16 determines whether the current registration buffer number has exceeded a maximum number Nmax that can be registered or not in a step S32. If not, then control returns to the step S22. If exceeded, the controller 16 sends a command to cancel the speech registration mode to the speech recognition circuit 15, thereby canceling the speech registration mode in a step S33. Then, control goes back to the step S22.

If the speech registration mode is not indicated by the mode selector switch 13 in the step S27, i.e., if the speech recognition mode is indicated by the mode selector switch 13 in the step S27, then the controller 16 outputs a speech recognition command to the speech recognition circuit 15 in a step S34. The speech recognition circuit 15 now effects, in a step S35, a speech recognition process as described above with reference to FIG. 8, i.e., by determining the distance D between the input voice command data and the standard pattern data to determine similarity therebetween. N The controller 16 reads a status register (not shown) in the speech recognition circuit 15 to determine whether the speech recognition of the input voice command is finished or not in a step S36. If the speech recognition is not yet finished, then the steps S35 and S36 are repeated until the registration is finished. If the speech recognition is finished, then the controller 16 determines whether the input voice command data and the standard pattern data coincide with each other, i.e., the distance D falls within a predetermined distance, or not in a step S37. If the input voice command data and the standard pattern data coincide with each other in the step S37, the controller 16 produces a remote control instruction signal SR based on the recognized voice command data and sends the remote control instruction signal SR to the transmitting circuit 4 in a step S38. In response to the remote control instruction signal SR, the transmitting circuit 17 transmits a corresponding remote control signal RC in a step S39. If the input voice command data and the standard pattern data do not coincide with each other in the step S37, then the controller 16 effects an error process such as the generation of a buzzer sound in a step S40, and control goes back to the step S22.

Then, the controller 16 determines whether the talk switch 12 is pressed or not by determining whether an operation control signal Sc is outputted or not in the step S22. If an operation control signal is outputted, then since the talk switch 12 is pressed, control goes to the step S25.

If the talk switch 12 is not pressed, the mute control circuit 19 supplies the transmitting circuit 17 with a remote control instruction signal SR for adding a signal that cancels the mute operation of the information reproducing device to a remote control signal RC. Responsive to the remote control instruction signal SR, the transmitting circuit 17 energizes the infrared light-emitting diode D1 to transmit a remote control signal for the cancellation of the mute operation to the information reproducing device in a step S23. The information reproducing device now effects a normal operation, e.g., increases the reproduced sound intrensity by 20 dB, so that the sound is reproduced at the normal level by the speakers.

Then, the controller 16 applies a control signal Sv to the power supply control circuit 14, which now supplies electric energy in the low power consumption mode in the step S14. Then, control returns to the step S22.

Since the start of entry of a voice command is detected to cause the information reproducing device to effect a mute operation, as described above, the sound reproduced by the information reproducing device is prevented from being picked up as ambient noise by the microphone of the transmitter. As a result, the speech recognition rate of the voice-operated remote control system is increased.

Third Embodiment

Figure 18:
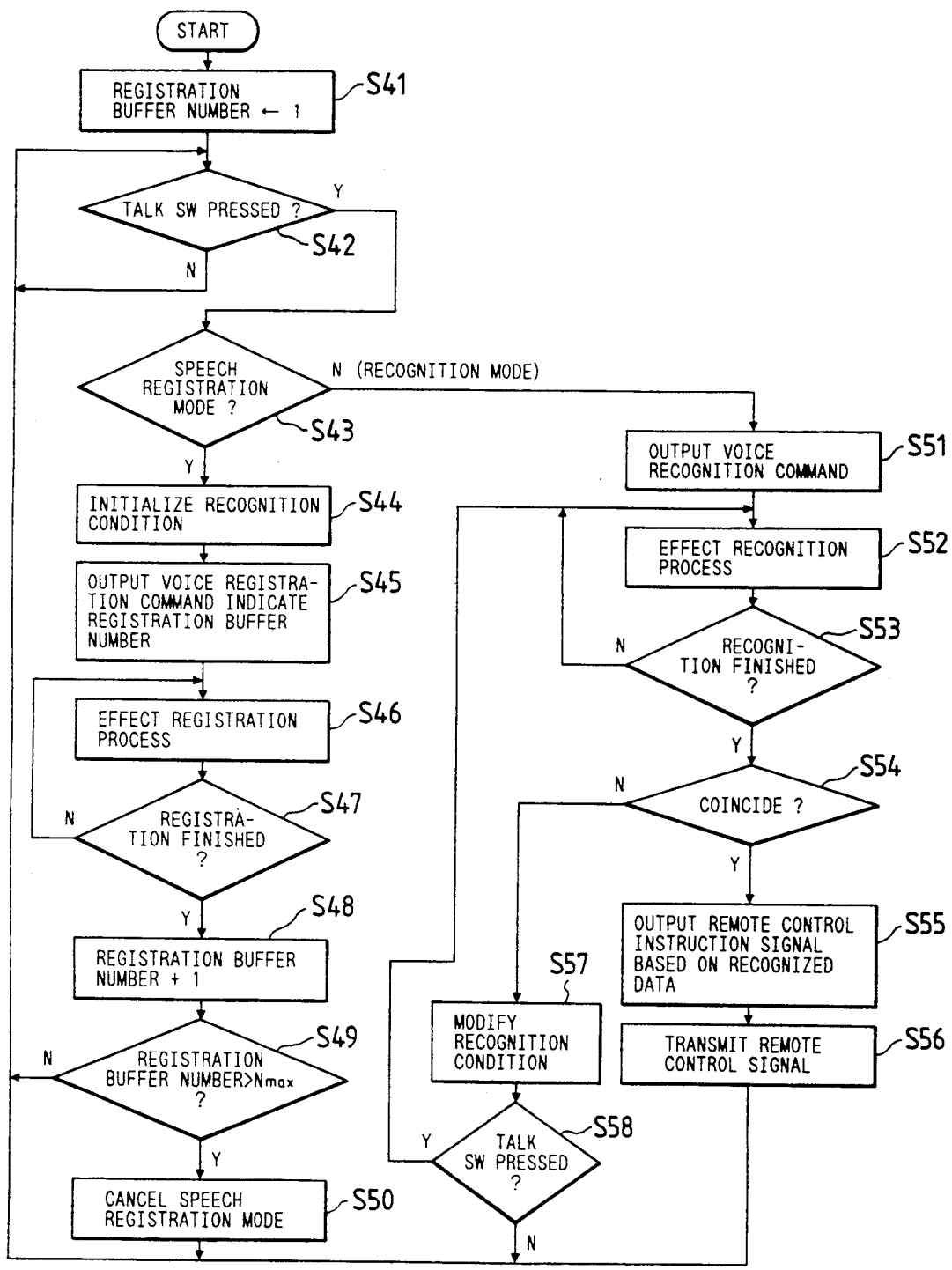
FIG. 18 is a flowchart of an operation sequence of the transmitter according to the third embodiment.

A voice-operated remote control system according to a third embodiment of the present invention will be described below with reference to FIGS. 16 through 18.

The voice-operated remote control system according to the third embodiment is basically designed to increase the speech recognition rate. The voice-operated remote control system has a recognition condition setting unit which operates with a speech recognition circuit, the arrangement being such that when the speech recognition circuit outputs a recognition rejection signal, the recognition condition setting unit automatically modifies recognition conditions.

External Structure

Figure 16:
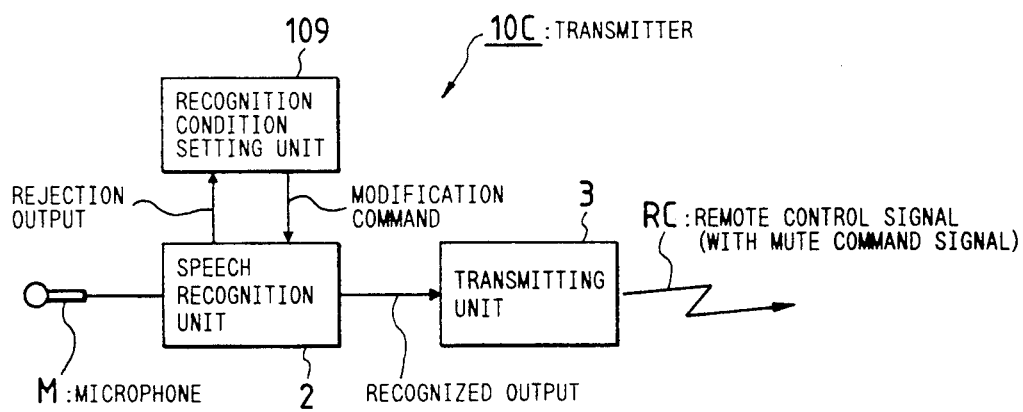
FIG. 16 is a block diagram of the transmitter of a voice-operated remote control system according to a third embodiment.
Figure 15:
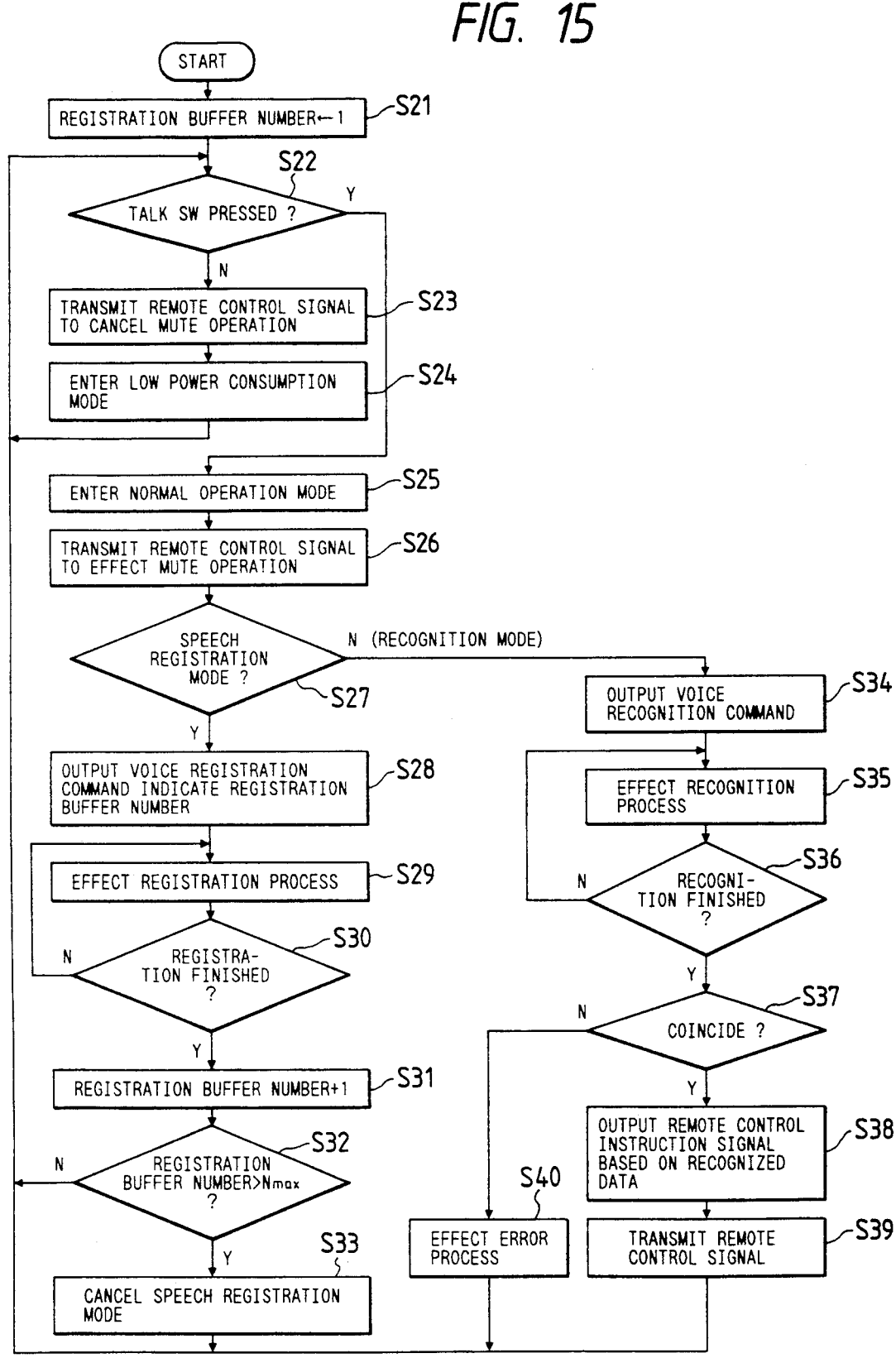
FIG. 15 is a flowchart of an operation sequence of the transmitter according to the second embodiment.

The external structure of the transmitter, generally indicated at 10C in FIGS. 16 and 17, of the voice-operated remote control system according to the third embodiment is basically the same as that of the transmitter 10B shown in FIG. 11. That is, the structural details, such as the shape of the casing 11, the type and location of the talk switch 12, the mode selector switch 13, and the infrared light-emitting diode D, are identical to those of the transmitter 10B shown in FIG. 11.

Electronic Circuit Structure

As shown in FIG. 16, the transmitter 10C has a recognition condition setting unit 109 connected to a speech recognition unit 2 which is supplied with an electric signal from a microphone M and applies a recognition output signal to a transmitter 3.

More specifically, as illustrated in FIG. 17, the transmitter 10C has a controller 16 which includes a recognition condition setting unit 109. The recognition condition setting unit 109 may be hardware-implemented by an independent electric circuit. In the illustrated embodiment, however, the recognition condition setting unit 109 is software-implemented according to a recognition control setting program which is either stored in a memory that stores a control program for the controller 16 or included in the control program for the controller 16. Specifically, the recognition condition setting unit 109 is implemented by a step S57 in FIG. 18.

The other structural details of the transmitter 10C are the same as those of the transmitter 10A shown in FIGS. 6 through 9.

Overall Operation

Now, operation of the transmitter 10C will be described below with reference to the flowchart of FIG. 18. It is assumed that the talk switch 12 is not pressed and the transmitter 1 is in a standby condition.

First, the controller 16 initializes a registration buffer number to 1 in a step S31.

Then, the controller 16 detects whether the talk switch 12 is pressed or not in a step S42 by detecting whether there is produced an operation control signal Sc from the talk switch 12 or not. If an operation control switch Sc is produced at this time, then it means that the talk switch 12 is pressed, and control goes to a step S43. If the talk switch 12 is not pressed, then the step S42 is repeated.

The controller 16 reads the condition of the mode selector switch 13 to determine whether it indicates the speech registration mode or not in a step S43.

If the speech registration mode is indicated, control then goes to a step S44 in which the controller 16 initializes recognition conditions. The controller 16 outputs a command to instruct the speech recognition circuit 15 to carry out a speech registration process in a step S45. At the same time, the controller 16 sends a registration buffer number to the speech recognition circuit 15 in the step S45.

The speech recognition circuit 15 then stores speech recognition standard pattern data in a corresponding registration buffer in the memory 23, i.e., a registration buffer having the registration buffer number=1, in a step S46.

The controller 16 reads a status register (not shown) in the speech recognition circuit 15 to determine whether the registration of a voice command is finished or not in a step S47. If the registration is not yet finished, then the steps S46 and S47 are repeated until the registration is finished. If the registration is finished, the registration buffer number is incremented by 1 in a step S48. The increment updates the registration buffer number, making the registration buffer ready for the storage of standard pattern data.

Then, the controller 16 determines whether the current registration buffer number has exceeded a maximum number Nmax that can be registered or not in a step S49. If not, then control returns to the step S42. If exceeded, the controller 16 sends a command to cancel the speech registration mode to the speech recognition circuit 15, thereby canceling the speech registration mode in a step S50. Then, control goes back to the step S42.

If the speech registration mode is not indicated by the mode selector switch 13 in the step S43, i.e., if the speech recognition mode is indicated by the mode selector switch 13 in the step S43, then the controller 16 outputs a speech recognition command to the speech recognition circuit 15 in a step S51. The speech recognition circuit 15 now effects, in a step S52, a speech recognition process as described above with reference to FIG. 8.

The controller 16 reads a status register (not shown) in the speech recognition circuit 15 to determine whether the speech recognition of the input voice command is finished or not in a step S53. If the speech recognition is not yet finished, then the steps S52 and S53 are repeated until the registration is finished. If the speech recognition is finished, then the controller 16 determines whether the input voice command data and the standard pattern data coincide with each other, i.e., the distance D falls within a predetermined distance, or not in a step S54. If the input voice command data and the standard pattern data coincide with each other in the step S54, the controller 16 produces a remote control instruction signal SR based on the recognized voice command data and sends the remote control instruction signal SR to the transmitting circuit 17 in a step S55. In response to the remote control instruction signal SR, the transmitting circuit 17 transmits a corresponding remote control signal RC in a step S56. If the input voice command data and the standard pattern data do not coincide with each other, i.e., a rejection signal is outputted, in the step S54, then the recognition condition setting unit 109 sends a modification command to modify the recognition conditions to the speech recognition circuit 15, which modify the recognition conditions into recognition conditions such that entered voice commands can be r recognized more easily, in a step S57. For example, if the distance D ($0 \leq D <$) is used as the recognition conditions, and the distance D is:

$$0 \leq D < 5$$

before is it modified, then it is modified into:

$$0 \leq D < 10.$$

With the recognition conditions thus modified, the probability that rejection signals are outputted is lowered, and hence the speech recognition rate is increased. When the speech recognition conditions are modified, the speech recognition circuit 15 uses the modified recognition conditions for a next recognition process. When standard pattern data are registered again, since the recognition conditions are initialized in the step S44, the initialized recognition conditions are used.

After the step S57, the controller 16 determines whether the talk switch 12 is pressed or not in a step S58. If the talk switch 12 is pressed, then control returns to the step S52 to start a recognition process. If the talk switch 12 is not pressed, then control goes back to the step S42.

As described above, if a rejection signal is produced in response to a voice command, the recognition condition setting unit 109 automatically supplies a modification command for modifying the recognition conditions to the speech recognition circuit 15. After the speech recognition circuit 15 modifies the recognition conditions, the controller 19 effects a recognition process again. Therefore, even if a certain time has elapsed after the registration of standard pattern data and voice commands entered by the operator are slightly altered, the speech recognition circuit 15 can correctly recognize those voice commands. Consequently, the operator is not required to reset the recognition conditions, and the speech recognition rate is increased.

Fourth Embodiment

A voice-operated remote control system according to a fourth embodiment of the present invention will be described below with reference to FIGS. 19 through 24.

The voice-operated remote control system according to the fourth embodiment is addressed to the reproduction of voice command words registered in the transmitter in case the operator forgets the registered voice command words. The voice-operated remote control system has either a transmitter 10D (FIG. 20) or a transmitter 10E (FIG. 21).

External Structure

Figure 19:
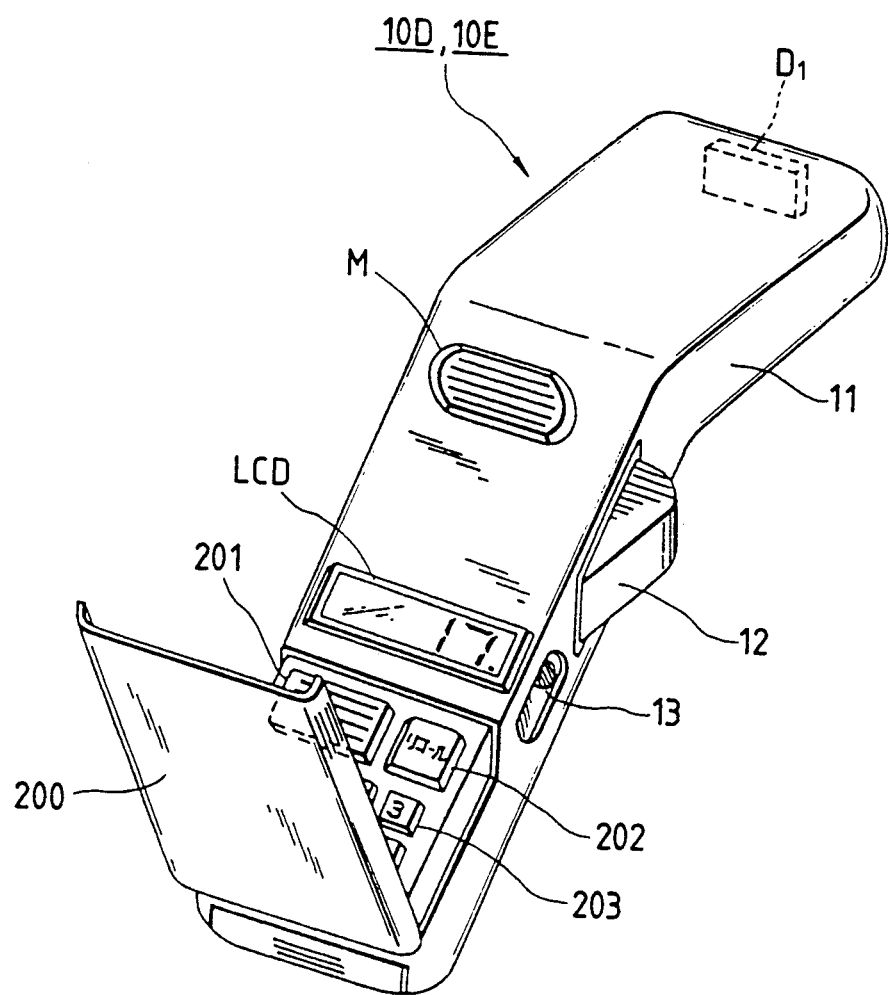
FIG. 19 is a perspective view of the transmitter of a voice-operated remote control system according to a fourth embodiment of the present invention.

As shown in FIG. 19, each of the transmitters 10D, 10E includes a portable casing 11 which has, on its upper panel, a microphone M for converting a voice command into an electric signal and a liquid crystal display LCD for displaying information necessary for remote control. The casing 11 also supports, at one end thereof, an infrared light-emitting diode D1 for transmitting a remote control signal. On one side of the casing 11, there are disposed a voice input switch 12 (hereinafter referred to as a "talk switch") which is closed when pressed, and a mode selector switch 13 for selecting one of a speech registration mode and a speech recognition mode at a time. An openable and closable cover 200 is hinged to the other end of the casing 11. The casing 11 also supports, on its portion which can be covered with the cover 200, a speaker 201 for reproducing voice commands, a recall switch 202 for instructing the reproduction of voice commands, and a ten-key switch 203 for indicating voice commands to be reproduced. The electronic circuit of the voice-operated remote control system is housed in the casing 11.

Electronic Circuit Structure

Figure 20:
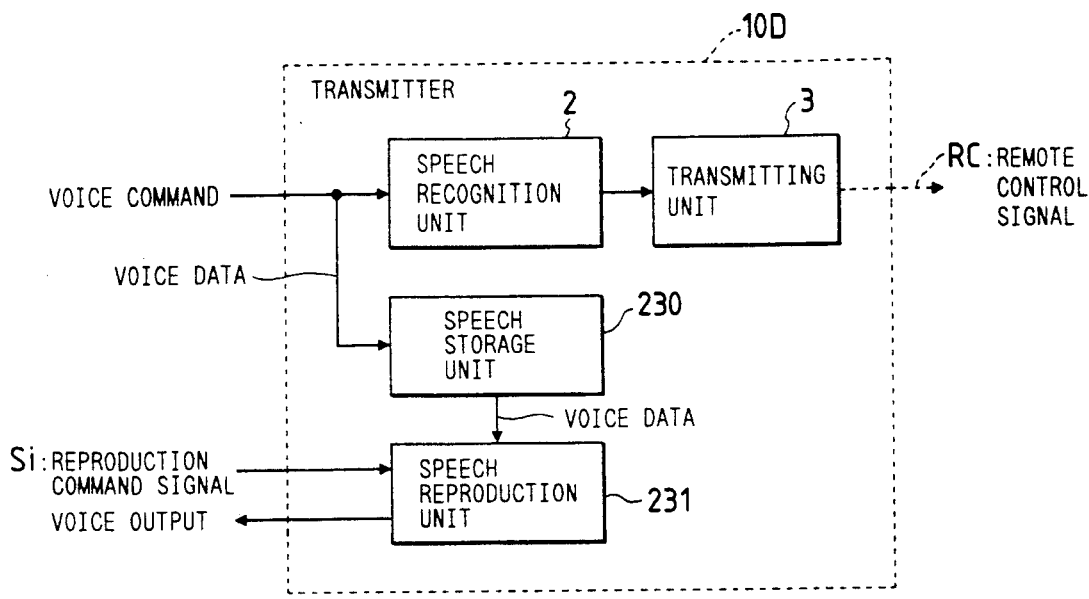
FIG. 20 is a block diagram of the transmitter of the voice-operated remote control system according to the fourth embodiment.
Figure 21:
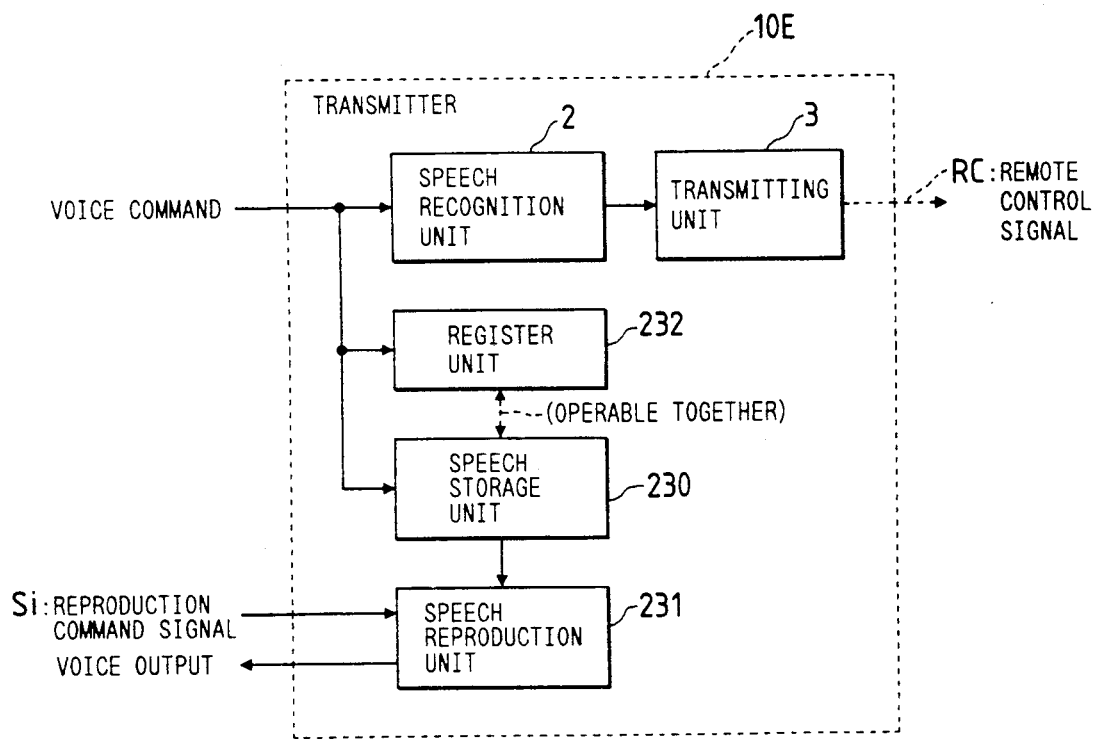
FIG. 21 is a block diagram of the transmitter of a voice-operated remote control system according to a fifth embodiment of the present invention.

As shown in FIG. 20, the transmitter 10D has, in addition to a speech recognition unit 2 and a transmitting unit 3, a speech storage unit 230 for storing data of voice commands and a speech reproducing unit 231 for reading voice command data from the speech storage unit 230 in response to an external reproduction command signal Si and converting the voice command data into a voice output.

In the transmitter 10D, the speech storage unit 230 stores data of voice commands. When an external reproduction command signal Si is applied, the stored voice command data are read from the speech storage unit 230 by the speech reproduction unit 231, and converted into a voice output thereby. Therefore, the transmitter 10D can reproduce a command word corresponding to a desired control command as a voice output.

As shown in FIG. 21, the transmitter 10E according to a modification has, in addition to a speech recognition unit 2 and a transmitting unit 3, a speech storage unit 230 for storing data of voice commands, a speech reproducing unit 231 for reading voice command data from the speech storage unit 230 in response to an external reproduction command signal Si and converting the voice command data into a voice output, and a register unit 232 for generating and registering comparative standard pattern data based on voice patterns of voice commands which are entered. The speech storage unit 230 operates with the register unit 232, for storing input voice command data at the time standard pattern data are generated by the register unit 232.

In the transmitter 10E, the speech storage unit 230 stores input voice command data at the time standard pattern data are generated by the register unit 232. Therefore, voice command data can be stored at the same time that standard pattern data are generated and registered. Consequently, it is not necessary to individually store voice command data for use in the reproduction of command words. Since the voice commands stored when the standard pattern data are registered can completely be reproduced, the voice-operated remote control system can control a controlled device correctly with desired voice commands.

Figure 22:
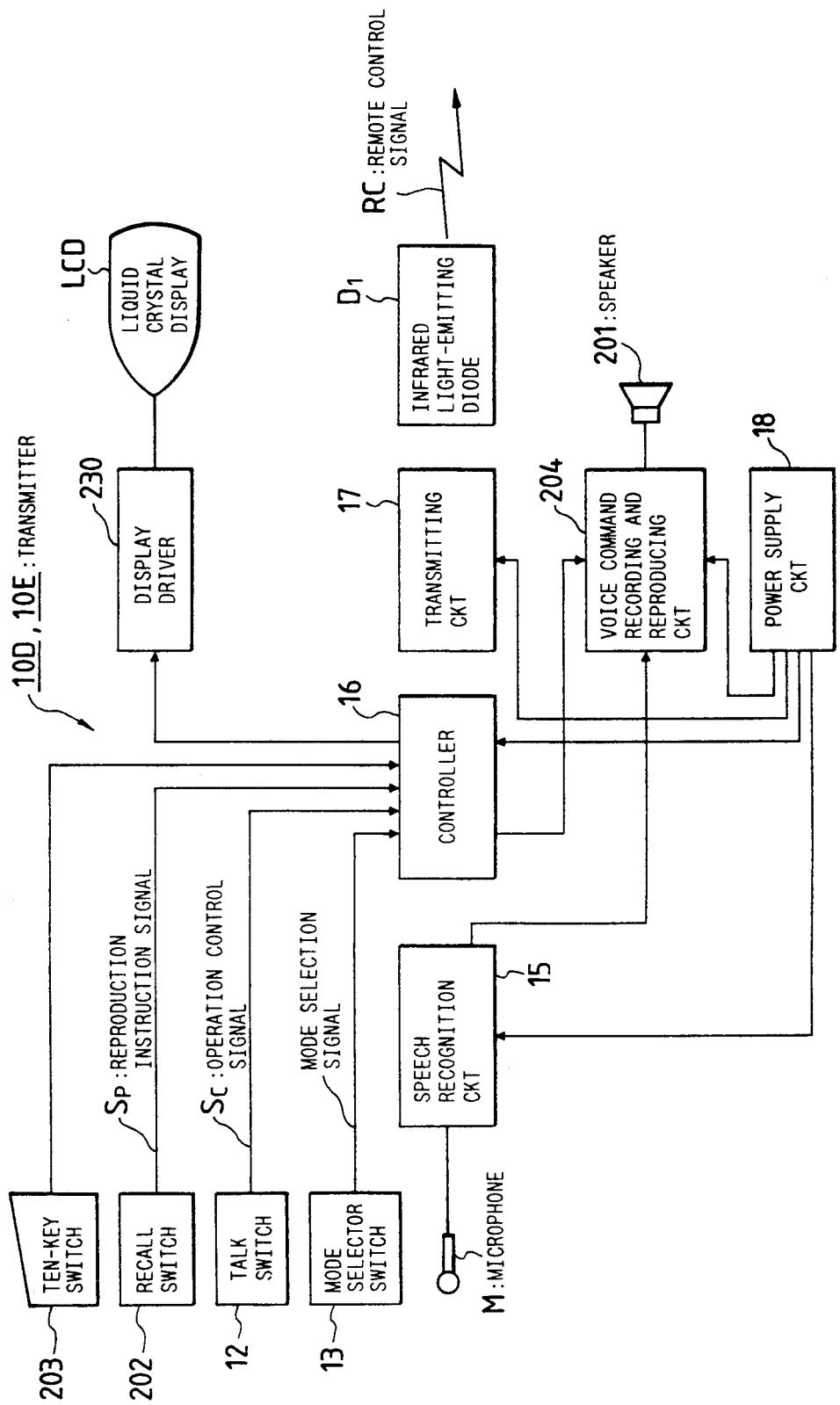
FIG. 22 is a detailed block diagram of the transmitter of each of the voice-operated remote control systems according to the fourth and fifth embodiments.

Each of the transmitters 10D, 10E shown in FIGS. 20 and 21, respectively, is of an arrangement shown in FIG. 22. The speech storage unit 230, the speech reproducing unit 231, and the register unit 232 are implemented by a voice command recording and reproducing circuit 204 shown in FIG. 22.

The voice command recording and reproducing circuit 204 is of the channel vocoder type.

Figure 23:
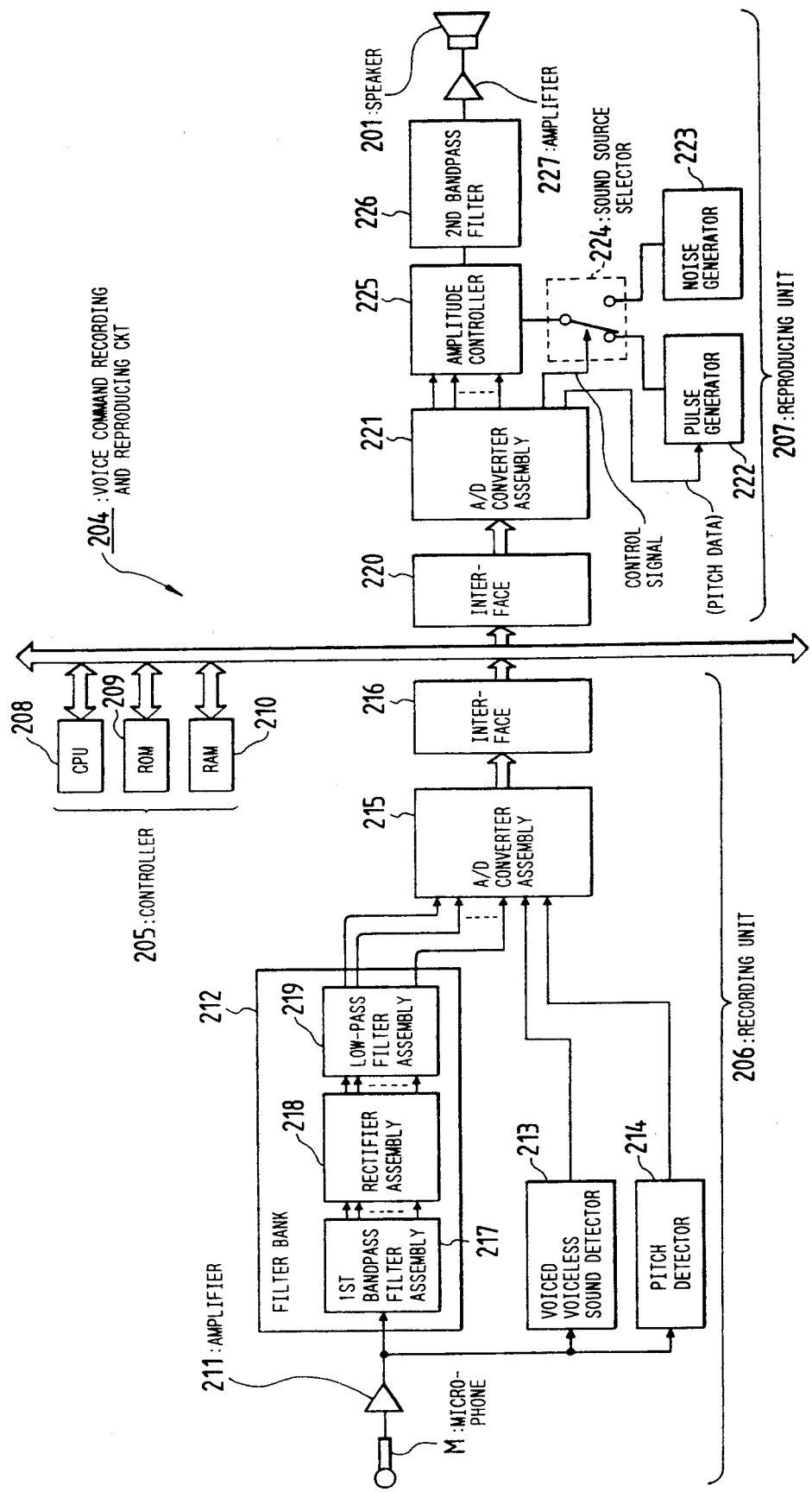
FIG. 23 is a block diagram of a voice command recording and reproducing circuit according to the fourth and fifth embodiments.

As shown in FIG. 23, the voice command recording and reproducing circuit 204 generally comprises a controller 205 for controlling the overall operation of the voice command recording and reproducing circuit 204, a recording unit 206 for recording voice commands, and a reproducing unit 207 for reproducing voice commands.

The controller 205 comprises a CPU 208 for controlling the voice command recording and reproducing circuit 204, a ROM 209 which stores a control program, and a RAM 210 for temporarily storing data of voice commands.

The recording unit 206 comprises an amplifier 211 for amplifying a voice command picked up by the microphone M to a suitable level, a filter bank 212 for dividing an output signal from the amplifier 211 into signals in frequency bands, rectifying the signals, and outputting the rectified signals, a voiced/voiceless sound detector 213 for determining whether an input voice command is voiced or voiceless, a pitch detector 214 for extracting the fundamental period of an input voice command if the input voice command is periodic, an analog-to-digital (A/D) converter 215 for converting output signals in the frequency bands from the filter bank 212, an output signal from the voiced/voiceless sound detector 213, and an output signal from the pitch detector 214, and an interface 216 for transmitting signals to the controller 205.

The filter bank 212 comprises a first bandpass filter assembly 217 for dividing an input voice command signal into signals in a plurality of frequency bands, a rectifier assembly 218 for rectifying output signals from the first bandpass filter assembly 217 in the frequency bands, and a low-pass filter assembly 219 for removing high-frequency components from output signals in the frequency bands from the rectifier assembly 218. The first bandpass filter assembly 217 comprises a plurality of bandpass filters (not shown) having different central frequencies, respectively. The rectifier assembly 218 comprises a plurality of rectifiers (not shown) connected in series with the bandpass filters of the bandpass filter assembly 217, for rectifying the signals in the respective frequency bands, respectively. The low-pass filter assembly 219 comprises a plurality of low-pass filters (not shown) connected in series with the rectifiers of the rectifier assembly 218, for removing the high-frequency components from the rectified output signals from the rectifier assembly 218.

The A/D converter assembly 215 comprises a plurality of A/D converters (not shown) connected respectively in series with the low-pass filters of the low-pass filter assembly 219, the voiced/voiceless sound detector 213, and the pitch detector 214. The A/D converters convert output signals from the low-pass filters, the voiced/voiceless sound detector 213, and the pitch detector 214 into digital signals.

The reproducing unit 207 comprises an interface 220 for receiving data from the control unit 204, a digital-to-analog (D/A) converter assembly 221 for converting digital data from the interface 220 into analog signals, a pulse generator 222 for generating a periodic pulsed signal, a noise generator 223 for generating noise, a sound source selector 224 for selecting the pulse generator 222 or the noise generator 224 depending on whether an original voice command is voiced or voiceless, and connecting the selected generator to an amplitude controller, an amplitude controller 225 for controlling the amplitude of output signals from the D/A converter 221 based on the output signal from the pulse generator 222 or the noise generator 223, a second bandpass filter assembly 226 for outputting the output signals from the D/A converter assembly 221 in the respective frequency bands, a speaker 201 for converting an electric signal into an acoustic signal, and an amplifier 227 for amplifying an output signal from the second bandpass filter 226 to a suitable level and driving the speaker 201 with the amplified signal.

The D/A converter assembly 221 comprises a plurality of D/A converters (not shown) for converting the digital data from the interface 220 into analog signals.

The second bandpass filter assembly 226 comprises a plurality of bandpass filters (not shown) which are of the same construction as the bandpass filters of the first bandpass filter assembly 217.

Operation of the voice command recording and reproducing circuit 204 will be described below.

First, a voice command is recorded as follows:
When a voice command is picked up by the microphone M, an electric output signals thereof is amplified to a suitable signal level by the amplifier 211. The amplified signal is then applied to the bandpass filters of the first bandpass filter assembly 217, and signals which have passed through the bandpass filters in their passbands are applied to the rectifier assembly 218. The signals applied to the rectifier assembly 218 are then rectified by the respective rectifiers which are connected in series with the bandpass filters. Output signals from the rectifiers contain high-frequency components, which are thereafter removed by the low-pass filters of the low-pass filter assembly 219 which are connected in series with the respective rectifiers. Output signals from the low-pass filters are then delivered to the A/D converters of the A/D converter assembly 215, which convert the signals into 4-bit time-division digital data, for example. At the same time, output signals from the voiced/voiceless sound detector 213 and the pitch detector 214 are converted into digital voiced/voiceless data and digital pitch data by the A/D converter assembly 215, respectively. The digital data obtained by the A/D converter assembly 215 are delivered through the interface 216 and stored in the RAM 210 under the control of the CPU 208. The time-division digital data of the input voice command, the voiced/voiceless data, and the pitch data are stored as digital data in the RAM 210 in the above fashion.

A voice command is reproduced as follows: When a reproduction instruction signal Sp is applied from the recall switch 202 to the CPU 208 of the control unit 205 and a voice command to be reproduced is indicated by the ten-key switch 203, the time-division digital data, the voiced/voiceless sound data, and the pitch data with respect to that voice command are read from the RAM 210 and supplied through the interface 220 to the D/A converter assembly 221. The time-division data which are supplied to the A/D converter assembly 221 are converted into analog data, which are then sent to the amplitude controller 225. At the same time, the voiced/voiceless sound data are also converted into analog data, which are applied as a control signal to the sound source selector 224. If the voice command is voiced, then the sound source selector 224 connects the pulse generator 222 to the amplitude controller 225, and if the voice command is voiceless, the source sound selector 224 connects the noise generator 223 to the amplitude controller 225. The pulse generator 222 generates pulses based on the pitch data which are applied thereto as analog data from the D/A converter 221.

The sound source signal, i.e., the periodic pulsed signal or noise, which is selected by the sound source selector 224 based on the voiced/voiceless sound data is delivered to the amplitude controller 225. The sound source signal is controlled in amplitude in the respective frequency bands by the amplitude controller 225 based on the time-division data of the voice command, and then supplied to the second bandpass filter assembly 226.

Output signals from the bandpass filters of the second bandpass filter assembly 226 are applied to the amplifier 207. The speaker 201 is driven by an output signal from the amplifier 207 to reproduce the voice command.

While the voice command recording and reproducing circuit 204 has been described as being of the channel vocoder type, another speech synthesizing system such as a PARCOR (Partial Auto-Correlation) or LSP (Linear Predictive Coding) system may be employed in the voice command recording and reproducing circuit 204.

The other structural details, for example, the speech recognition circuit 15, shown in FIG. 22 are identical to those shown in FIGS. 6 through 9 and 13 and 14, and will not be described in detail. As shown in FIG. 22, the output signals from the ten-key switch 203 and the recall switch 202 are supplied to the controller 16 to give operation instructions for the above control operation.

Overall Operation

The transmitter 10D or 10E operates depending on whether the talk switch 12 is pressed or released (i.e., turned on or off). If the talk switch 12 is pressed, the transmitter 1 is capable of transmitting remote control signals, and if the talk switch 12 is released, the transmitter 10D or 10E is kept in a standby condition, waiting for voice commands to be applied. There are two input modes for entering voice commands. In one input mode, voice commands of the operator are registered, and in the other input mode, voice commands of the operator are recognized. In the voice registration mode, a command word such as "reproduction", for example is recorded in the transmitter 1.

When the recall switch 202 is pressed, the transmitter 10D or 10E is brought into a condition capable of reproducing voice commands. The transmitter 10D or 10E can reproduce a voice command corresponding to an input signal applied from the ten-key switch 203, through the speaker 201.

Figure 24:
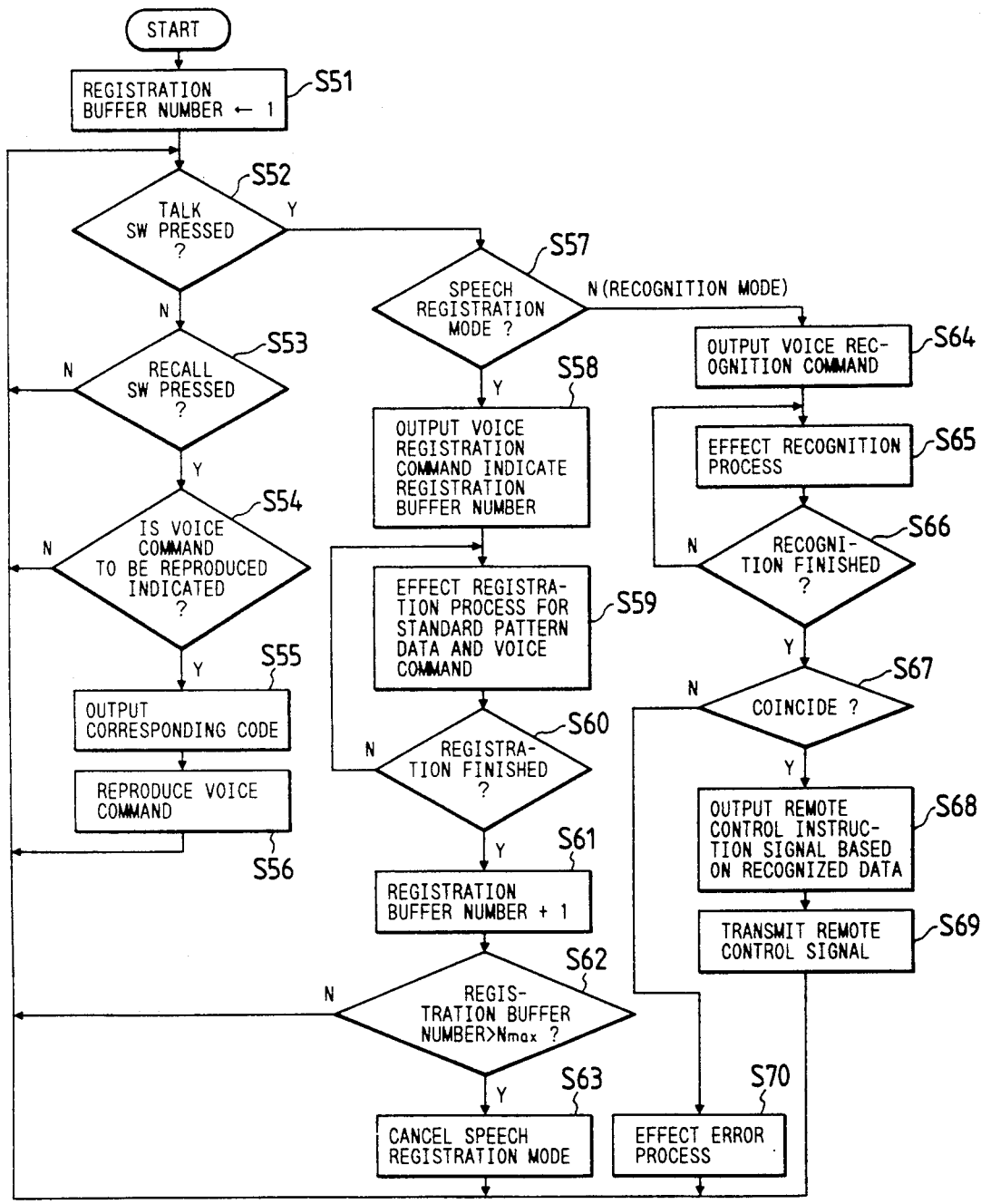
FIG. 24 is a flowchart of an operation sequence of the voice command recording and reproducing circuit shown in FIG. 23.

Now, operation of the transmitter 10D or 10E will be described below with reference to the flowchart of FIG. 24. It is assumed that the talk switch 12 is not pressed and the transmitter 1 is in a standby condition.

First, a registration buffer number is set at 1, (step 51) and the controller 16 detects whether the talk switch 12 is pressed or not in a step S52 by detecting whether there is produced an operation control signal Sc from the talk switch 12 or not. If an operation control switch Sc is produced at this time, then it means that the talk switch 12 is pressed, and the controller 16 enables the transmitter 10D or 10E in the step S52.

If the talk switch 12 is not pressed, then the controller 16 determines whether the recall switch 202 is pressed or not by determining whether a reproduction indicating signal Sp is issued or not in a step S53. If the reproduction indicating signal Sp is issued, then it means that the recall switch 202 is pressed, and the controller 16 wait until a signal indicating a voice command to be reproduced is entered from the ten-key switch 203 in a step S54. If a voice command to be reproduced is indicated by the ten-key switch 203, the controller 16 sends a code corresponding to the indicated voice command to the voice command recording and reproducing circuit 204 in a step S55. Then, the voice command recording and reproducing circuit 204 generates a voice command based on the code according to the process described above in a step S56. Thereafter, control goes back to the step S52. If any voice command to be reproduced is not indicated after elapse of a predetermined period of time in the step S54, then control returns to the step S52.

Thereafter, the controller 16 reads the condition of the mode selector switch 13 to determine whether it indicates the speech registration mode or not in a step S57.

If the speech registration mode is indicated, control then goes to a step S58 in which the controller 16 outputs a command to instruct the speech recognition circuit 15 to carry out a speech registration process. At the same time, the controller 16 instructs the voice command recording and reproducing circuit 204 to record a voice command, and sends a registration buffer number to the speech recognition circuit 15 and the voice command recording and reproducing circuit 204 in the step S58.

The speech recognition circuit 15 then stores speech recognition standard pattern data in a corresponding registration buffer in the memory 23, i.e., a registration buffer having the registration buffer number =1, in a step S59. The voice command recording and reproducing circuit 204 also records data of the voice command in the step S59.

The controller 16 reads a status register (not shown) in the speech recognition circuit 15 and a status register (not shown) in the voice command recording and reproducing circuit 204 to determine whether the registration and recording of a voice command is finished or not in a step S60. If the registration and recording is not yet finished, then the steps S59 and S60 are repeated until the registration and recording is finished. If the registration and recording is finished, the registration buffer number is incremented by 1 in a step S61.

Then, the controller 16 determines whether the current registration buffer number has exceeded a maximum number Nmax that can be registered or not in a step S62. If not, then control returns to the step S52. If exceeded, the controller 16 sends a command to cancel the speech registration mode to the speech recognition circuit 15, thereby canceling the speech registration mode in a step S63. Then, control goes back to the step S52.

If the speech registration mode is not indicated by the mode selector switch 13 in the step S57, i.e., if the speech recognition mode is indicated by the mode selector switch 13 in the step S57, then the controller 16 outputs a speech recognition command to the speech recognition circuit 15 in a step S64. The speech recognition circuit 15 now effects a speech recognition process as described above with reference to FIG. 8 in a step S65. b The controller 16 reads a status register (not shown) in the speech recognition circuit 15 to determine whether the speech recognition is finished or not in a step S66. If the speech recognition is not yet finished, then the steps S65 and S66 are repeated until the speech recognition is finished. If the speech recognition is finished, then the controller 16 determines whether the input voice command data and the standard pattern data coincide with each other, i.e., the distance D falls within a predetermined distance, or not in a step S67. If the input voice command data and the standard pattern data coincide with each other, the controller 16 produces a remote control instruction signal SR based on the recognized voice command data and sends the remote control instruction signal SR to the transmitting circuit 17 in a step S68. In response to the remote control instruction signal SR, the transmitting circuit 17 transmits a corresponding remote control signal RC in a step S69. If the input voice command data and the standard pattern data do not coincide with each other in the step S67, then the controller 16 effects an error process such as the generation of a buzzer sound in a step S70, and control goes back to the step S52.

As described above, when the recall switch 202 is pressed and a voice command which the operator wants to be reproduced is indicated by the ten-key switch 203, the desired voice command is reproduced through the speaker 201. As a result, even if the operator forgets the word of a registered voice command, it can easily be reproduced, and can be registered again simply.

In the above embodiment, whether the recall switch 202 is pressed or not is determined after the talk switch 2 is pressed. However, whether the recall switch 202 is pressed or not may be determined independent of the talk switch 12, so that a voice command can be reproduced at any desired time.

While the ten-key switch is employed to indicate a voice command to be reproduced in the above embodiment, individual keys corresponding to respective voice commands may instead be employed to indicate the voice commands to be reproduced. For example, if a voice command for a recording operation is to be reproduced, a key for reproducing a voice command for a recording operation is pressed. This arrangement simplifies a process of reproducing a voice command.

In the circuit arrangement shown in FIG. 20, data of a voice command are stored in the speech storage unit, and are read from the speech storage unit by the speech reproduction unit 231 in response to an external reproduction command signal. Therefore, even if the operator forgets the word for a voice command, it can be recalled from the remote control system, and is not required to be registered again.

In the circuit arrangement shown in FIG. 21, voice command data are stored at the same time that standard pattern data are generated and registered. Therefore, it is not necessary to individually store voice command data for the reproduction of command words. Since voice commands as registered can completely be reproduced, the remote control system can remotely control the controlled device correctly with the voice commands.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A voice-operated remote control system for use with an information reproducing device which reproduces sound through acoustic radiating means at an adjustable sound pressure level, said voice-operated remote control system comprising:
   a transmitter for converting a voice command into a remote control signal and transmitting the remote control signal; and
   a receiver, adapted to be associated with the information reproducing device, for receiving the remote control signal, decoding the remote control signal into a control command, and supplying the control command to the information reproducing device;
   said transmitter having detecting means for detecting whether a voice command is to be applied thereto and producing a detected signal, and mute control means for lowering the sound pressure level of the sound reproduced by the information reproducing device depending on said detected signal from said detecting means, before the voice command starts being applied.

2. A voice-operated remote control system according to claim 1, wherein said transmitter has a talk switch for producing a signal to enable the transmitter to transmit the remote control signal when the voice command is applied.

3. A voice-operated remote control system according to claim 2, wherein said detecting means comprises means for detecting whether a voice command is applied to the transmitter by detecting the signal from said talk switch.

4. A voice-operated remote control system comprising:
   a transmitter comprising;

a microphone for converting a voice command into an electric signal;

standard pattern data registering means for registering standard pattern data in a registering mode;

speech recognition means, operable in a recognition mode, for converting the voice command into pattern data based on the electric signal from said microphone, comparing the pattern data of the voice command with the registered standard pattern data, determining whether the result of comparison satisfies a speech recognition condition, and transmitting a remote control signal corresponding to the voice command when the satisfaction is determined; and a receiver for receiving the remote control signal, decoding the remote control signal into a control command, and supplying the control command to a controlled device;

said transmitter having recognition condition setting means for automatically modifying said speech recognition condition, in the recognition mode, when the voice command is rejected by said speech recognition means, wherein said speech recognition condition is modified so as to increase the probability of subsequent recognition of said rejected voice command.

5. A voice-operated remote control system comprising:

a transmitter for converting a voice command into a remote control signal and transmitting the remote control signal; and a receiver for receiving the remote control signal, decoding the remote control signal into a control command, and supplying the control command to a controlled device; said transmitter comprising:

a speech storage unit for storing data corresponding to each voice command; and a speech reproduction unit for reading data of a voice command from said speech storage unit in response to an external reproduction command signal and converting and outputting the voiced command data into a corresponding audible voice output.

6. A voice-operated remote control system according to claim 5, further including a register unit for generating and registering comparative standard pattern data based on the voice command data, said speech storage unit having means, operable with said register unit, for storing the voice command data when the standard pattern data are generated by said register unit.

7. A voice-operated remote control system according to claim 5, wherein said speech storage unit comprises an amplifier for amplifying a signal of an input voice command picked up by a microphone to a predetermined level, a filter bank for dividing an output signal from said amplifier into signals in respective frequency bands and rectifying the signals in the frequency bands, a voiced/voiceless sound detector for determining whether the input voice command is voiced or voiceless, a pitch detector for detecting the fundamental period of the input voice command if the input voice command is periodic, and an analog-to-digital converter for converting the rectified signals in the frequency bands from said filter bank, an output signal from said voiced/voiceless sound detector, and an output signal from said pitch detector into corresponding digital signals.

8. A voice-operated remote control system according to claim 5, wherein said speech reproduction unit comprises a digital-to-analog converter for converting the data from said speech storage unit into an analog signal, a pulse generator for generating a periodic pulsed signal, a noise generator for generating noise, a sound source selector for selecting said pulse generator or said noise generator depending on whether the input voice command is voiced or voiceless, an amplitude controller for controlling the amplitude of the periodic pulsed signal or the noise based on the analog signal from said digital-to-analog converter, a bandpass filter for passing an output signal from said amplitude controller in the frequency bands, an amplifier for amplifying an output signal from said bandpass filter to a predetermined level, and a speaker for converting an output signal from said amplifier into an acoustic signal.

9. A voice-operated remote control system according to claim 6, further including a transmitter for transmitting the remote control signal, said speech storage unit, said speech reproduction unit, and said register unit being included in said transmitter.

* * * * *